United States Patent
Fox et al.

(10) Patent No.: US 10,088,006 B2
(45) Date of Patent: Oct. 2, 2018

(54) ROTATIONAL INERTER AND METHOD FOR DAMPING AN ACTUATOR

(71) Applicant: The Boeing Company, Chicago, IL (US)

(72) Inventors: Michael T. Fox, Saint Charles, MO (US); Jeffrey M. Roach, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 15/159,706

(22) Filed: May 19, 2016

(65) Prior Publication Data

US 2017/0335916 A1 Nov. 23, 2017

(51) Int. Cl.
*B64C 9/00* (2006.01)
*F16F 7/10* (2006.01)
*F16F 15/02* (2006.01)
*B64C 13/40* (2006.01)
*F15B 15/02* (2006.01)

(52) U.S. Cl.
CPC ............ *F16F 7/1028* (2013.01); *B64C 13/40* (2013.01); *F15B 15/02* (2013.01); *F16F 7/1011* (2013.01); *F16F 15/02* (2013.01); *F16F 2222/08* (2013.01); *F16F 2232/02* (2013.01)

(58) Field of Classification Search
CPC ........ F16F 7/1022; F16F 15/02; F16F 7/1034; F16F 2222/08; F16F 2232/06; F16F 2232/02; F16H 19/04; F16H 25/2233; F16H 2025/2075; B64C 13/34; B64C 9/02; B64C 13/36; B60G 13/16; Y02T 50/44
See application file for complete search history.

(56) References Cited

U.S. PATENT DOCUMENTS 1,291,664 A * 1/1919 Von Schrenk ......... G05G 1/405
                                                        292/36
1,584,931 A * 5/1926 Handy ...................... F02D 9/00
                                                        137/483
1,928,961 A * 10/1933 Brown .................... A01B 63/06
                                                        172/492

(Continued)

FOREIGN PATENT DOCUMENTS

DE      102012215614 A1    5/2014
EP         1001184         5/2000
WO     WO2012054774 A2    4/2012

OTHER PUBLICATIONS

Extended European Search Report, Appl. No. EP17161213, dated Oct. 10, 2017.

*Primary Examiner* — Medhat Badawi

(57) ABSTRACT

An apparatus for damping an actuator includes an inerter. The inerter includes a first terminal and a second terminal movable relative to one another along an inerter axis and configured to be mutually exclusively coupled to a support structure and a movable device actuated by an actuator. The inerter further includes a rod coupled to and movable with the first terminal and a threaded shaft coupled to and movable with the second terminal. The inerter further includes a flywheel having a flywheel annulus coupled to one of the rod and the threaded shaft. The flywheel is configured to rotate in proportion to axial acceleration of the rod relative to the threaded shaft in correspondence with actuation of the movable device by the actuator.

24 Claims, 16 Drawing Sheets

(56) References Cited

U.S. PATENT DOCUMENTS

| | | | | |
|---|---|---|---|---|
| 2,611,282 A * | 9/1952 | Bright | F16H 21/10 | 74/518 |
| 2,620,772 A * | 12/1952 | McLane | B64C 13/24 | 244/226 |
| 2,669,401 A * | 2/1954 | Bosserman | B64C 13/00 | 244/82 |
| 2,679,827 A * | 6/1954 | Perdue | F01B 17/00 | 188/317 |
| 2,720,368 A * | 10/1955 | Payne, Jr. | B64C 13/00 | 244/223 |
| 2,721,446 A * | 10/1955 | Bumb | F15B 1/24 | 138/31 |
| 2,796,774 A * | 6/1957 | Peed, Jr. | B64C 13/24 | 244/230 |
| 2,817,483 A * | 12/1957 | Hill | B64C 13/40 | 244/76 R |
| 2,856,179 A * | 10/1958 | Hogan | B64C 25/60 | 188/129 |
| 2,916,205 A * | 12/1959 | Litz | F15B 11/02 | 116/DIG. 42 |
| 2,974,908 A * | 3/1961 | Platt | B64C 13/24 | 244/178 |
| 3,205,728 A * | 9/1965 | Morris | B64C 29/0091 | 74/491 |
| 3,303,714 A * | 2/1967 | Fontaine | B64C 13/46 | 244/223 |
| 3,369,779 A * | 2/1968 | Frederiksen | B64C 13/24 | 244/226 |
| 3,603,577 A * | 9/1971 | DeRaad | F16F 7/06 | 188/129 |
| 3,625,005 A * | 12/1971 | Saunders et al. | B60T 13/162 | 60/548 |
| 3,633,366 A * | 1/1972 | Cripe | B60T 13/10 | 60/550 |
| 3,693,474 A * | 9/1972 | Trick | E02F 9/2004 | 251/233 |
| 3,707,075 A * | 12/1972 | Cripe | B60T 7/04 | 60/550 |
| 3,709,522 A * | 1/1973 | Olson | B60D 1/155 | 180/904 |
| 4,005,617 A * | 2/1977 | Sourbel | B60T 7/06 | 74/516 |
| 4,054,186 A * | 10/1977 | Banks, Jr. | F16F 7/1022 | 188/184 |
| 4,177,882 A * | 12/1979 | Dowell | F16L 3/202 | 188/185 |
| 4,241,814 A * | 12/1980 | Masclet | F16D 57/06 | 188/266 |
| 4,276,967 A * | 7/1981 | Dowell | F16F 7/1022 | 188/134 |
| 4,474,273 A * | 10/1984 | Le Pierres | F16F 7/04 | 188/129 |
| 4,525,126 A * | 6/1985 | Laumont | F04C 11/008 | 417/310 |
| 4,595,158 A * | 6/1986 | Robinson | B64C 9/02 | 244/223 |
| 4,722,238 A * | 2/1988 | Navarro | B23F 1/06 | 74/422 |
| 4,739,962 A * | 4/1988 | Morita | F16F 9/34 | 267/140.13 |
| 4,773,620 A * | 9/1988 | Seidel | B64C 3/50 | 244/99.2 |
| 4,865,269 A * | 9/1989 | Metcalf | B64C 13/14 | 244/224 |
| 4,898,257 A * | 2/1990 | Brandstadter | B60G 17/0152 | 180/22 |
| 5,307,892 A * | 5/1994 | Phillips | B62D 5/09 | 180/422 |
| 5,337,864 A * | 8/1994 | Sjostrom | B60G 13/18 | 188/266.2 |
| 5,431,015 A * | 7/1995 | Hein | F15B 15/068 | 244/99.5 |
| 5,435,531 A * | 7/1995 | Smith | F16F 15/02 | 188/378 |
| 5,593,109 A * | 1/1997 | Williams | B64C 13/50 | 244/3.21 |
| 5,620,168 A * | 4/1997 | Ohtake | F16F 13/26 | 267/140.13 |
| 5,704,596 A * | 1/1998 | Smith | F16F 7/1005 | 188/285 |
| 5,788,029 A * | 8/1998 | Smith | F16F 7/1005 | 188/267 |
| 5,992,582 A * | 11/1999 | Lou | F16F 9/12 | 188/267.1 |
| 6,230,450 B1 * | 5/2001 | Kuroda | E04H 9/02 | 188/322.5 |
| 6,253,888 B1 * | 7/2001 | Bell | F16F 9/504 | 188/275 |
| 6,352,143 B1 * | 3/2002 | Niaura | F16F 9/532 | 188/267.1 |
| 6,412,616 B1 * | 7/2002 | Allen | B60G 11/56 | 188/301 |
| 6,622,972 B2 * | 9/2003 | Urnes, Sr. | G05D 1/0055 | 244/194 |
| 6,679,185 B2 * | 1/2004 | Sullivan | B61B 10/046 | 104/172.1 |
| 6,698,688 B1 * | 3/2004 | Jones | B64C 1/26 | 244/215 |
| 6,983,832 B2 * | 1/2006 | Namuduri | F16F 9/36 | 188/267.2 |
| 7,051,849 B2 * | 5/2006 | Browne | F16F 9/535 | 188/266.4 |
| 7,225,905 B2 * | 6/2007 | Namuduri | F16F 9/535 | 188/267.1 |
| 7,285,933 B2 * | 10/2007 | A'Harrah | B64C 13/10 | 244/175 |
| 7,316,303 B2 | 1/2008 | Smith | | |
| 7,484,743 B2 * | 2/2009 | Gorodisher | B60G 17/04 | 280/89.13 |
| 7,510,150 B2 * | 3/2009 | Williams | B64C 9/02 | 244/211 |
| 7,631,736 B2 * | 12/2009 | Thies | B60G 17/0272 | 188/380 |
| 8,567,714 B2 * | 10/2013 | Sheahan, Jr. | B64C 13/24 | 244/213 |
| 8,611,201 B2 * | 12/2013 | Desjardins | G11B 19/2018 | 369/263.1 |
| 8,725,321 B2 * | 5/2014 | Hagerott | B64C 9/04 | 701/10 |
| 8,881,876 B2 * | 11/2014 | Smith | F16F 7/1034 | 188/293 |
| 9,103,466 B2 * | 8/2015 | McNeely | F16K 1/126 | |
| 9,127,507 B2 * | 9/2015 | Jensen | E21B 4/006 | |
| 9,315,256 B2 * | 4/2016 | Maenz | B64C 9/02 | |
| 9,316,297 B2 * | 4/2016 | Watanabe | F16H 25/12 | |
| 9,334,914 B2 * | 5/2016 | Gartner | F16F 7/1022 | |
| 9,340,278 B2 * | 5/2016 | Hagerott | B64C 9/04 | |
| 2003/0005142 A1 * | 1/2003 | Elzur | H04L 69/22 | 709/232 |
| 2004/0079839 A1 * | 4/2004 | Bath | B64C 1/26 | 244/131 |
| 2005/0034943 A1 * | 2/2005 | Smith | F16F 7/1022 | 188/301 |
| 2005/0217906 A1 * | 10/2005 | Spark | B60T 8/24 | 180/22 |
| 2007/0045918 A1 * | 3/2007 | Thornhill | F16F 13/1463 | 267/140.12 |
| 2009/0139225 A1 * | 6/2009 | Wang | F15B 7/008 | 60/469 |
| 2010/0148463 A1 * | 6/2010 | Wang | B60G 13/14 | 280/124.101 |
| 2012/0227485 A1 * | 9/2012 | Gregory | G01M 1/36 | 73/460 |
| 2013/0030648 A1 * | 1/2013 | Matsumoto | B60W 10/06 | 701/37 |
| 2013/0032442 A1 * | 2/2013 | Tuluie | B60G 13/16 | 188/378 |

(56) References Cited

U.S. PATENT DOCUMENTS

| | | | |
|---|---|---|---|
| 2013/0037362 A1* | 2/2013 | Gartner | F16F 7/1034 |
| | | | 188/378 |
| 2014/0156143 A1* | 6/2014 | Evangelou | B60G 17/0157 |
| | | | 701/37 |
| 2014/0246820 A1* | 9/2014 | Chen | F16F 15/02 |
| | | | 267/140.11 |
| 2016/0229443 A1* | 8/2016 | Takei | B62D 3/126 |
| 2017/0297748 A1* | 10/2017 | Zondervan | B64C 17/02 |
| 2017/0314584 A1* | 11/2017 | Holtgraver | F16H 19/04 |
| 2017/0335916 A1* | 11/2017 | Fox | F16F 7/1028 |
| 2018/0065151 A1* | 3/2018 | Houston | H02K 7/061 |

\* cited by examiner

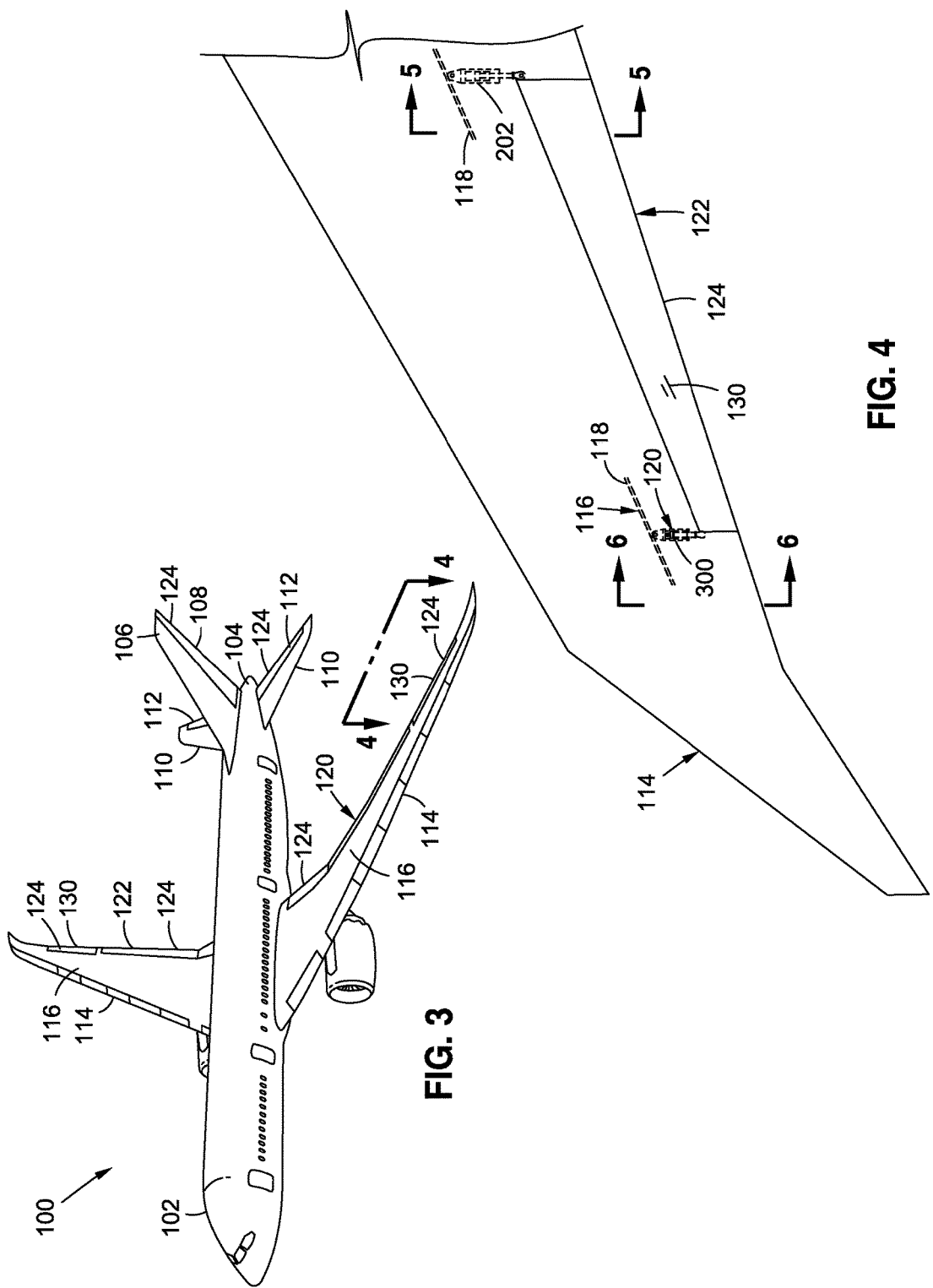

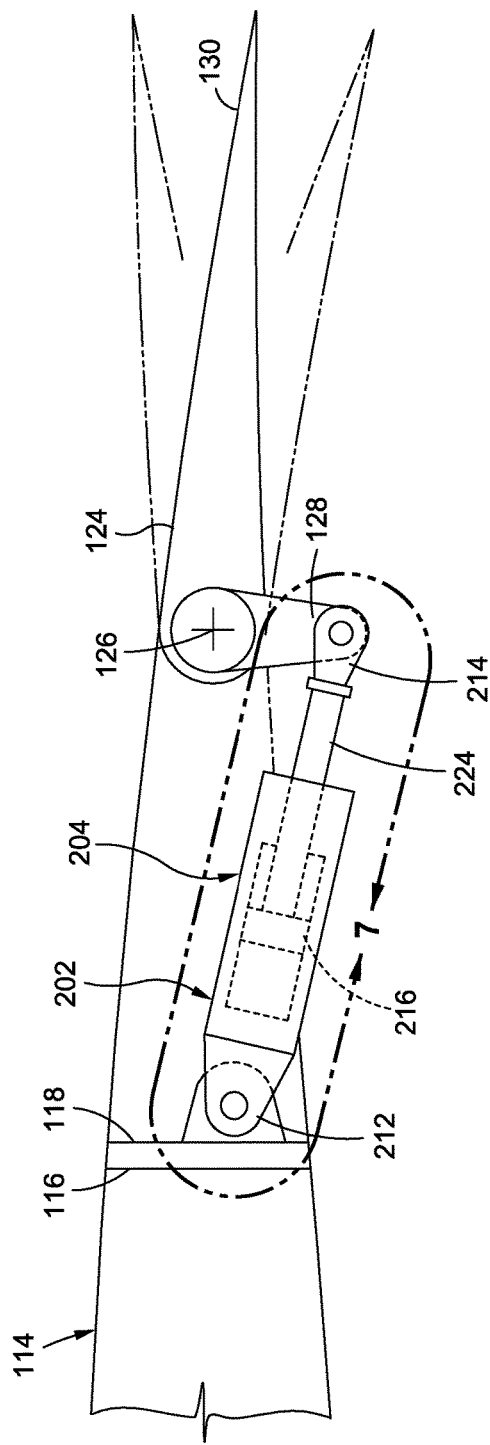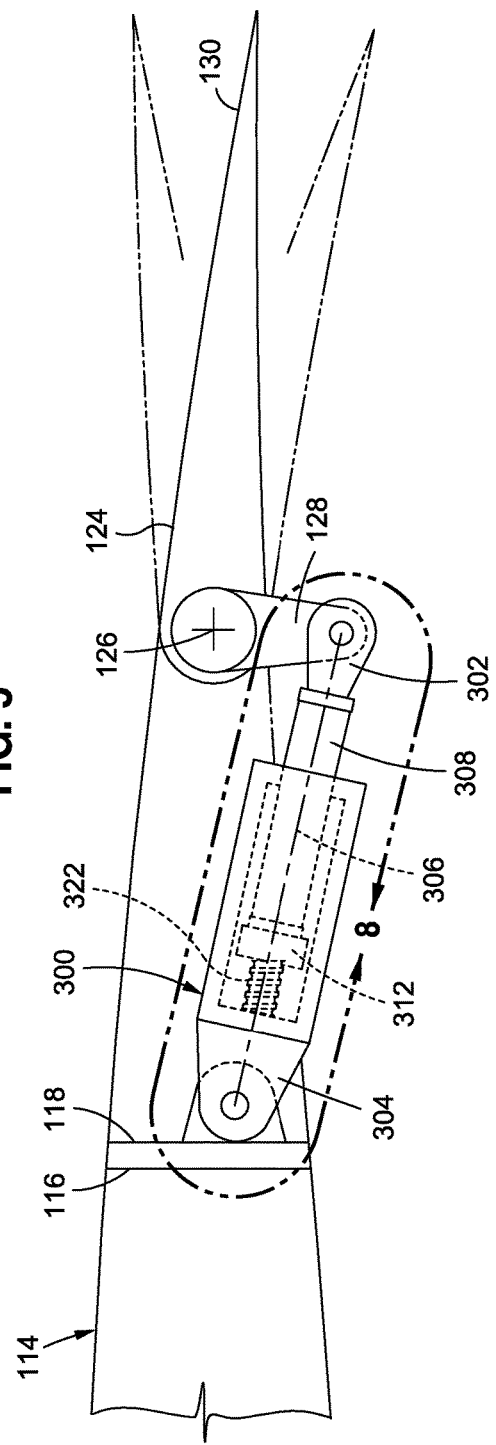

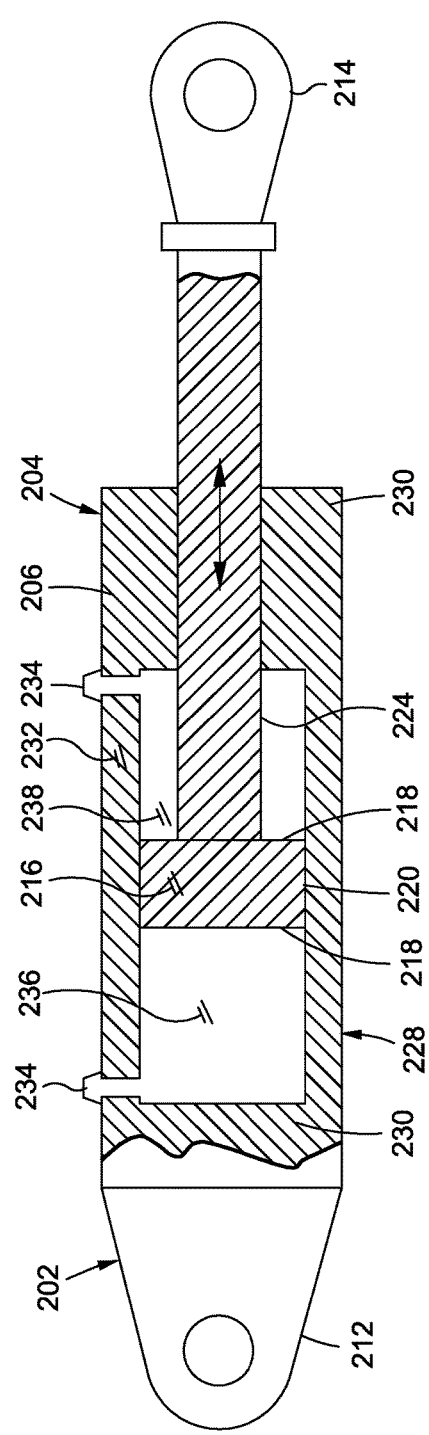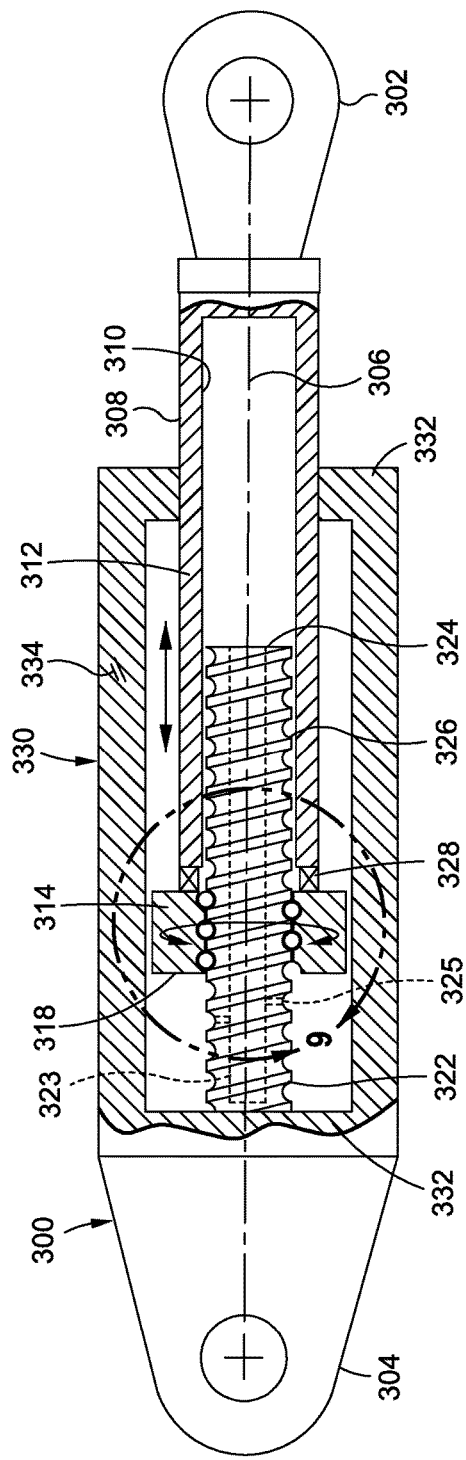
FIG. 7
FIG. 8

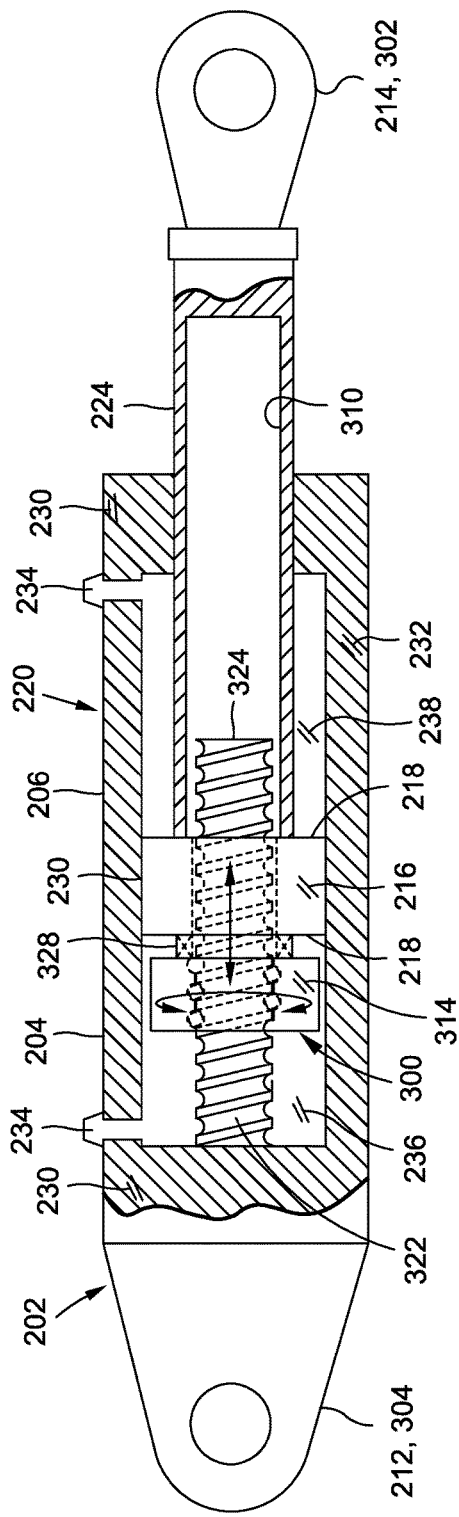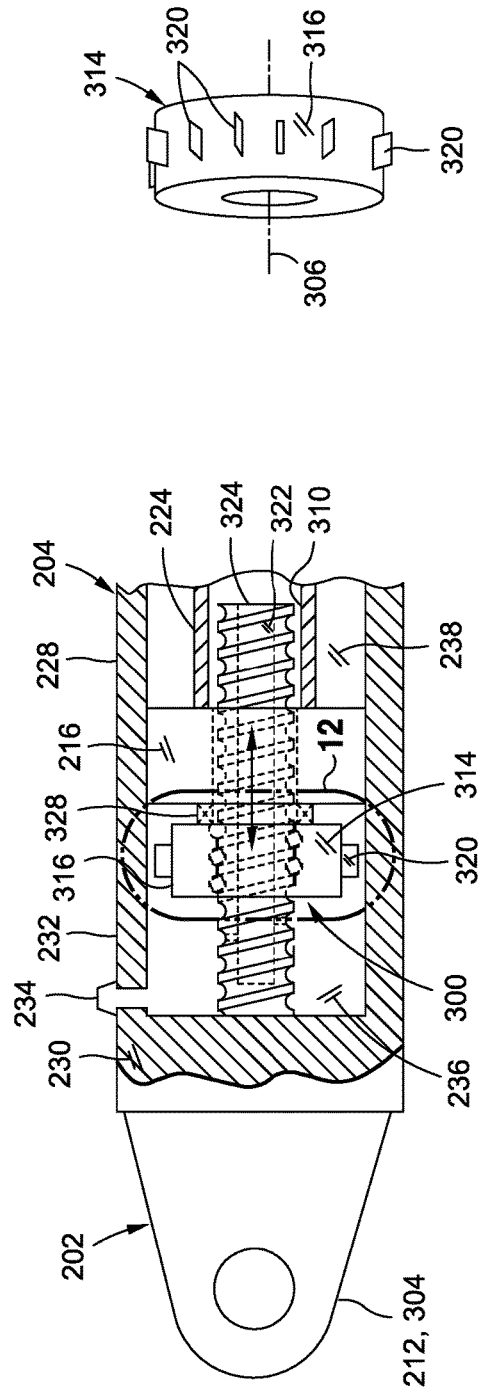

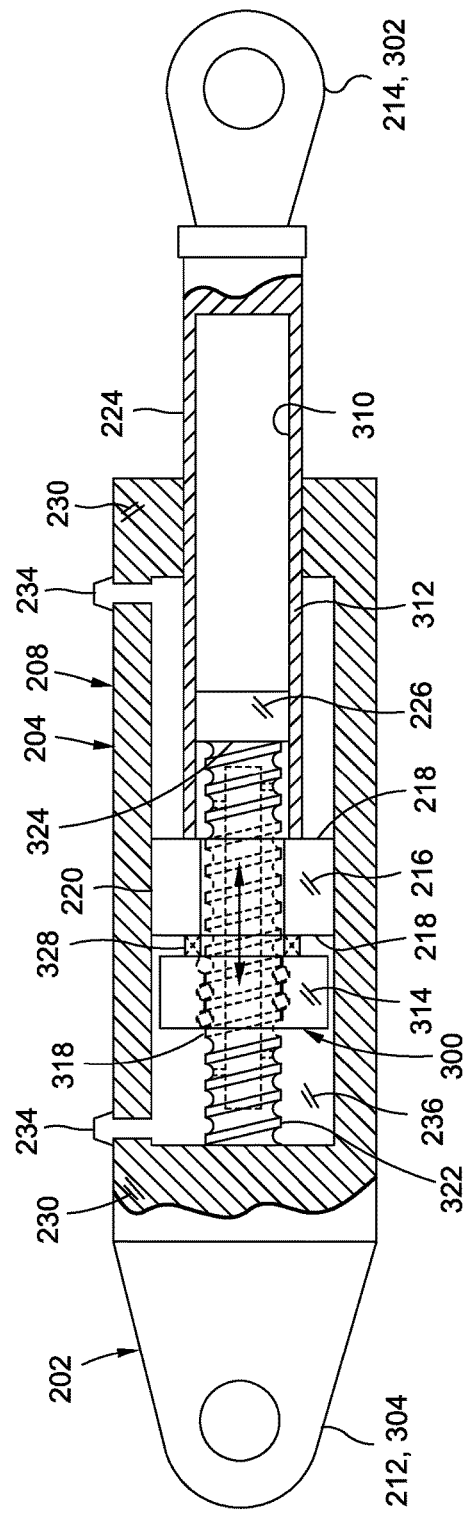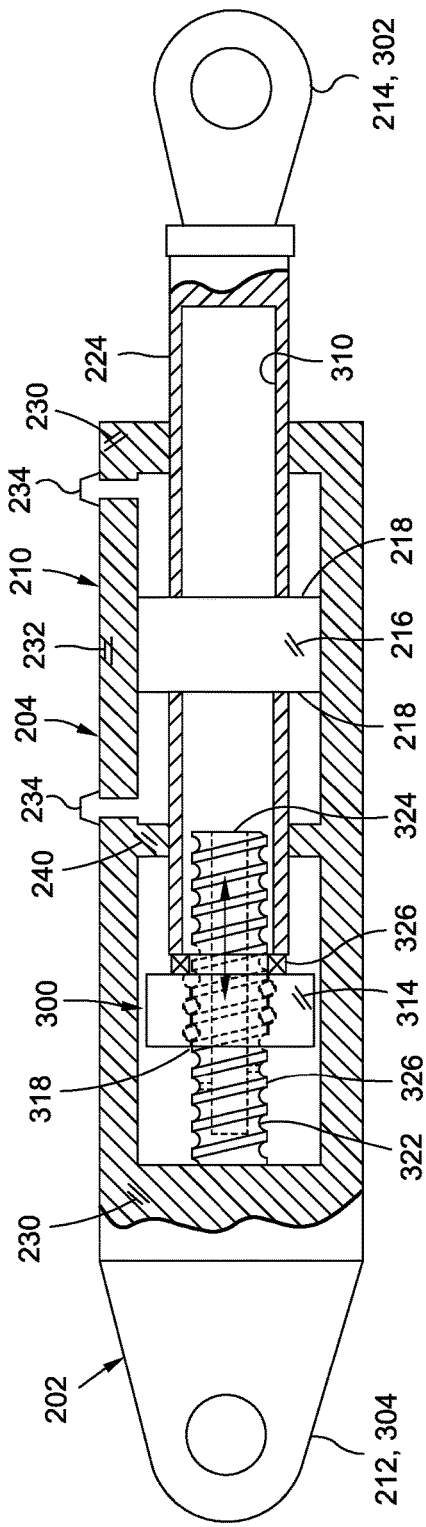

ROTATIONAL INERTER AND METHOD FOR DAMPING AN ACTUATOR

FIELD

The present disclosure relates to actuators and, more particularly, to a rotational inerter and method for damping an actuator.

BACKGROUND

Aircraft typically include a flight control system for directional and attitude control of the aircraft in response to commands from a flight crew or an autopilot. A flight control system may include a plurality of movable flight control surfaces such as ailerons on the wings for roll control, elevators on the horizontal tail of the empennage for pitch control, a rudder on the vertical tail of the empennage for yaw control, and other movable control surfaces. Movement of a flight control surface is typically effected by one or more actuators mechanically coupled between a support structure (e.g., a wing spar) and the flight control surface (e.g., an aileron). In many aircraft, the actuators for flight control surfaces are linear hydraulic actuators driven by one or more hydraulic systems which typically operate at a fixed working pressure.

One of the challenges facing aircraft designers is preventing the occurrence of flutter of the flight control surfaces during flight. Control surface flutter may be described as unstable aerodynamically-induced oscillations of the flight control surface, and may occur in flight control systems where the operating bandwidth of the flight control system overlaps the resonant frequency of the flight control surface. Unless damped, the oscillations may rapidly increase in amplitude with the potential for undesirable results, including exceeding the strength capability of the mounting system of the flight control surface and the actuator. Contributing to the potential for control surface flutter is elasticity in the flight control system. For example, hydraulic actuators may exhibit a linear spring response under load due to compressibility of the hydraulic fluid. The compressibility of the hydraulic fluid may be characterized by the cross-sectional area of the actuator piston, the volume of the hydraulic fluid, and the effective bulk modulus of elasticity of the hydraulic fluid.

One method of addressing control surface flutter involves designing the flight control system such that the operating bandwidth does not overlap the resonant frequency of the flight control surface, and may include limiting the inertia of the load on the actuator and/or increasing the piston cross-sectional area as a means to react the inertia load. Unfortunately, the above known methods result in an actuator system that is sized not to provide the actuator with static load-carrying capability, but rather to provide the actuator with the ability to react larger inertia as a means to avoid resonance in the operating bandwidth. As may be appreciated, limiting control surface inertia corresponds to a decrease in control surface area. A decrease in the surface area of higher inertia control surfaces of an aircraft empennage may reduce the attitude controllability of the aircraft. As may be appreciated, an increase in the piston cross-sectional area of an actuator corresponds to an increase in the size and weight of the hydraulic system components including the size and weight of the actuators, tubing, reservoirs, and other components. The increased size of the actuators may protrude further outside of the outer mold line of the aerodynamic surfaces resulting in an increase in aerodynamic drag of an aircraft. The reduced attitude controllability, increased weight of the hydraulic system, and increased aerodynamic drag may reduce safety, fuel efficiency, range, and/or payload capacity of the aircraft.

As can be seen, there exists a need in the art for a system and method for allowing the operating bandwidth of an actuator to match or encompass the resonant frequency of a movable device without oscillatory response.

SUMMARY

The above-noted needs associated with actuators are specifically addressed and alleviated by the present disclosure which provides an apparatus including an inerter for damping an actuator. The inerter includes a first terminal and a second terminal movable relative to one another along an inerter axis and configured to be mutually exclusively coupled to a support structure and a movable device actuated by an actuator. In one example, the inerter further includes a rod coupled to and movable with the first terminal. The inerter also includes a threaded shaft coupled to and movable with the second terminal. The inerter additionally includes a flywheel having a flywheel annulus coupled to the rod. The flywheel is configured to rotate in proportion to axial acceleration of the rod relative to the threaded shaft in correspondence with actuation of the movable device by the actuator.

Also disclosed is aircraft having a flight control surface pivotably coupled to a support structure of the aircraft. The aircraft further includes a hydraulic actuator configured to actuate the flight control surface. In addition, the aircraft includes an inerter having a first terminal and a second terminal mutually exclusively coupled to the support structure and the flight control surface. The inerter additionally includes a rod movable with the first terminal, and a threaded shaft movable with the second terminal. The inerter also includes a flywheel coupled to the rod and the threaded shaft. The flywheel is configured to rotate in proportion to axial acceleration of the rod relative to the threaded shaft in correspondence with actuation of the flight control surface by the actuator.

In addition, disclosed is a method of damping an actuator. The method includes actuating, using an actuator, a movable device. In addition, the method includes axially accelerating, using an inerter coupled to the movable device, a first terminal relative to a second terminal of the inerter simultaneous with and in proportion to actuation of the movable device. Furthermore, the method includes rotationally accelerating a flywheel of the inerter in proportion to and simultaneous with the axial acceleration of the first terminal relative to the second terminal. Additionally, the method includes reducing actuator load oscillatory amplitude of the movable device and actuator in response to rotationally accelerating the flywheel.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a perspective view of an aircraft;

FIG. 4 is a top view of a portion of a wing illustrating an actuator and an inerter operatively coupled to an aileron;

FIG. 5 is a sectional view of a wing taken along line 5 of FIG. 4 and illustrating an example of a linear hydraulic actuator mechanically coupled between a wing spar and one end of an aileron;

FIG. 6 is a sectional view of the wing taken along line 6 of FIG. 4 and illustrating an example of an inerter coupled to the aileron on an end opposite the actuator;

FIG. 7 is a sectional view of an example of a linear hydraulic actuator having a piston axially slidable within an actuator housing;

FIG. 8 is a sectional view of an example of an inerter having a rod coupled to a first terminal and a threaded shaft coupled to a second terminal and including a flywheel threadably engaged to the threaded shaft and configured to rotate in proportion to axial acceleration of the rod and first terminal relative to the threaded shaft and second terminal;

FIG. 10 is a sectional view of an example of an inerter integrated into an unbalanced hydraulic actuator and illustrating the inerter flywheel rotatably coupled to a piston of the hydraulic actuator;

FIG. 11 is a sectional view of an example of an inerter having flywheel protrusions for generating viscous damping within hydraulic fluid during rotation of the flywheel;

FIG. 12 is a perspective view of an example of an inerter taken along line 12 of FIG. 11 and illustrating a plurality of radially extending flywheel blades circumferentially spaced around the flywheel perimeter;

FIG. 13 is a sectional view of an example of an inerter integrated into a partially-balanced hydraulic actuator having an interior piston axially slidable within the piston rod;

FIG. 14 is a sectional view of an example of an inerter integrated into a balanced hydraulic actuator having opposing piston sides with substantially equivalent cross-sectional areas;

DETAILED DESCRIPTION

Figure 1:
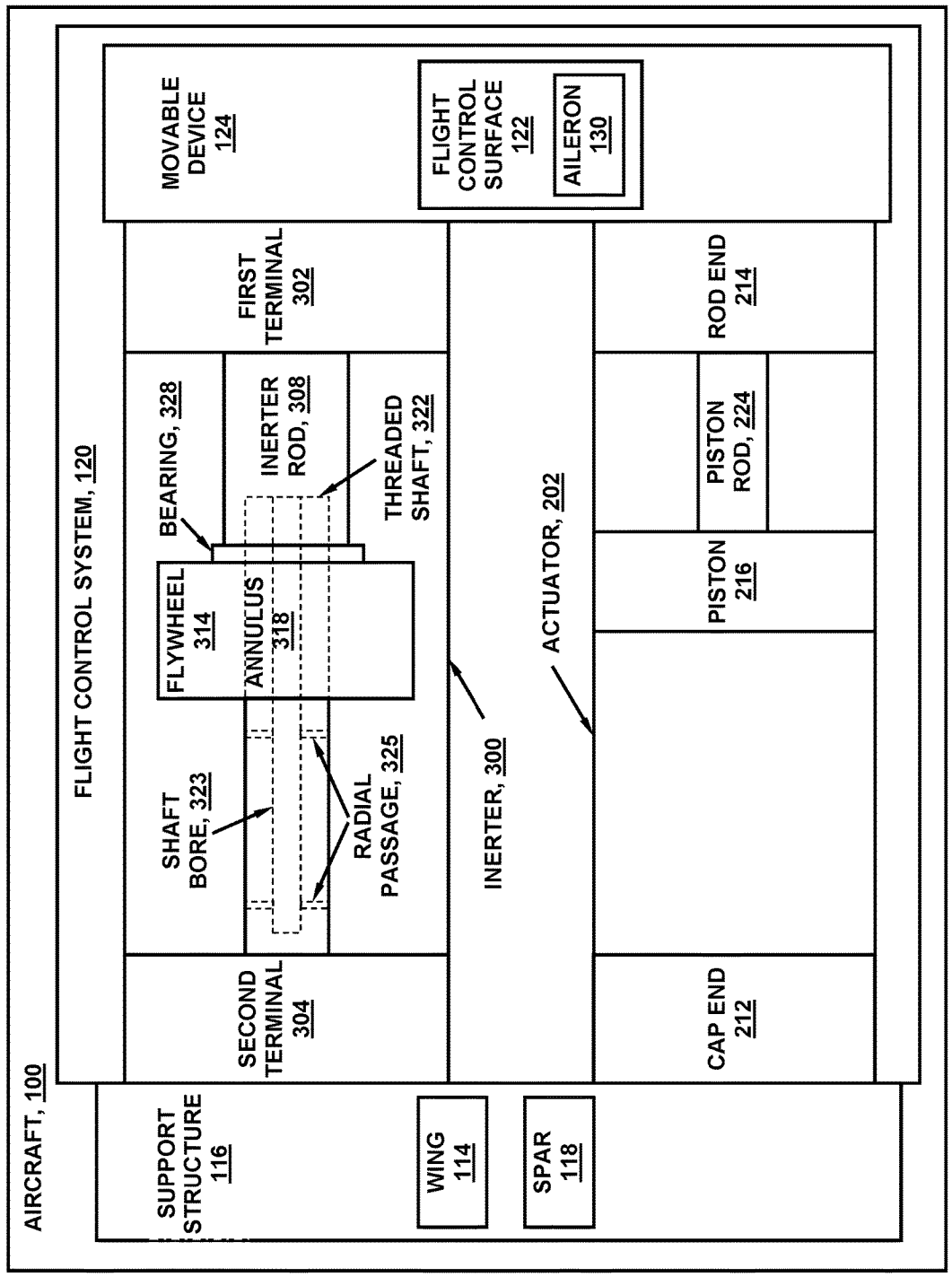
FIG. 1 is a block diagram of a flight control system of an aircraft including a hydraulic actuator for actuating a flight control surface and further including an inerter for damping the hydraulic actuator.

Referring now to the drawings wherein the showings are for purposes of illustrating various examples of the present disclosure, shown in FIG. 1 is a block diagram of a hydraulic actuator 204 coupled between a support structure 116 and a movable device 124 and configured to move or actuate the movable device 124. The block diagram advantageously includes a rotational inerter 300 for damping the actuator 202. The inerter 300 is shown coupled between the support structure 116 and the movable device 124 and is configured to improve the dynamic response of the movable device 124 during actuation by the actuator 202, as described in greater detail below. In the example shown in FIGS. 1 and 4-9, the inerter 300 is provided as a separate component from the actuator 202. However, in other examples (e.g., FIGS. 2 and 10-21) described below, the inerter 300 is integrated into the actuator 202.

The actuator 202 includes a piston 216 coupled to a piston rod 224. The piston 216 is slidable within an actuator housing 228 (e.g., a cylinder). The actuator 202 further includes a rod end 214 and a cap end 212 axially movable relative to one another in response to pressurized hydraulic fluid acting in an unbalanced manner on one or both sides of the piston 216 inside the actuator housing 228. In the example shown, the rod end 214 is coupled to the movable device 124 and the cap end 212 is coupled to the support structure 116. However, the actuator 202 may be mounted such that the rod end 214 is coupled to the support structure 116 and the cap end 212 is coupled to the movable device 124.

Referring still to FIG. 1, the inerter 300 includes a first terminal 302 and a second terminal 304 axially movable or translatable relative to one another along an inerter axis 306

(FIG. 8) in correspondence with actuation of the movable device 124 by the actuator 202. In the example shown, the first terminal 302 is coupled to the movable device 124 and the second terminal 304 is coupled to the support structure 116. However, the inerter 300 may be mounted such that the first terminal 302 is coupled to the support structure 116 and the second terminal 304 is coupled to the movable device 124. In an example not shown, the support structure to which the inerter 300 is coupled may be a different support structure than the support structure 116 to which the actuator 202 is coupled.

The inerter 300 includes an inerter rod 308 coupled to and axially movable (e.g., translatable) with the first terminal 302. The inerter rod 308 may be aligned with or parallel to the inerter axis 306. The inerter rod 308 may be hollow to define a rod bore 310. The threaded shaft 322 is coupled to and axially movable (e.g., translatable) with the second terminal 304. The threaded shaft 322 may be aligned with or parallel to the inerter axis 306. The threaded shaft 322 has a free end 324 that may be receivable within the rod bore 310. The threaded shaft 322 may be hollow or may include a shaft bore 323 open on the free end 324 of the threaded shaft 322. The threaded shaft 322 may include radial passages 325 extending radially from the shaft bore 323 to the exterior side of the threaded shaft 322 to allow fluid flow between the exterior side of the threaded shaft 322 and the shaft bore 323. The shaft bore 323 may allow fluid hydraulic fluid—not shown) to flow from the fluid cavity at a second terminal 304 (for non-integrated inerters—FIG. 1) or cap end 212 (for integrated inerters—FIG. 2), through the shaft bore 323, and into the fluid cavity at the free end 324 (FIG. 8) of the threaded shaft 322 to allow the fluid to lubricate moving parts of the bearing 328 and/or at the flywheel annulus 318. The size (e.g., diameter) of the shaft bore 323 and the size (e.g., diameter) and quantity of the radial passages 325 may be configured to apportion fluid flow to the bearing 328 and the flywheel annulus 318.

As shown in FIG. 1, the inerter 300 includes a flywheel 314 (e.g., a spinning mass). In some examples (e.g., FIGS. 6 and 8-16), the flywheel 314 is threadably coupled to the threaded shaft 322 which converts linear motion of the threaded shaft 322 into rotational motion of the flywheel 314. The flywheel 314 is configured to rotate in proportion to axial movement of the inerter rod 308 relative to the threaded shaft 322 in correspondence with actuation of the movable device 124 by the actuator 202. In this regard, the flywheel 314 is configured to rotationally accelerate and decelerate in proportion to axial acceleration and deceleration of the inerter rod 308 (e.g., coupled to the first terminal 302) relative to the threaded shaft 322 (e.g., coupled to the second terminal 304).

Advantageously, the flywheel 314 is coupled to the inerter rod 308 at a flywheel annulus 318 and is threadably engaged to the threaded shaft 322, as shown in FIGS. 1, 8-9, and 14 and described in greater detail below. However, in other examples, the flywheel annulus 318 may be coupled to the piston 216 as shown in FIGS. 10-13 and 15-16 and described below. In still further examples, the flywheel annulus 318 may be coupled to the actuator housing 228 as shown in FIGS. 17-20 and described below.

Regardless of the component to which the flywheel 314 is coupled, the flywheel 314 may include at least one bearing 328 (e.g., a thrust bearing 328) at the flywheel annulus 318 to rotatably couple the flywheel 314 to the inerter rod 308 (FIGS. 1, 8-9, and 14), the piston 216 (FIGS. 10-13 and 15-16), or the actuator housing 228 (FIGS. 17-20). The bearing 328 allows the flywheel 314 to axially translate with the inerter rod 308 as the flywheel 314 rotates on the threads of the threaded shaft 322 in response to axial movement of the inerter rod 308 relative to the threaded shaft 322. Advantageously, by coupling the flywheel 314 to the component (i.e., the inerter rod 308, the piston 216, or the actuator housing 228) at the flywheel annulus 318 instead of at the flywheel perimeter 316, the flywheel 314 exhibits limited flexure in the axial direction during high-frequency, oscillatory, axial acceleration of the first terminal 302 relative to the second terminal 304. Such axial flexure of the flywheel mass would otherwise reduce flywheel rotational motion during high-frequency, oscillatory, axial acceleration.

Referring still to the example of FIG. 1, the support structure 116 is shown configured as a spar 118 of a wing 114 of an aircraft 100. The movable device 124 is shown as a flight control surface 122 of a flight control system 120 of the aircraft 100. The flight control surface 122 may be hingedly coupled to the rigid support structure 116 such as a wing spar 118 or other structure. The flight control surface 122 may be pivotably about a hinge axis 126. The flight control surface 122 may comprise any one of a variety of different configurations including, but not limited to, a spoiler, an aileron, an elevator 112, an elevon, a flaperon, a rudder 108, a high-lift device such as a leading edge slat, a trailing edge flap, or any other type of movable device 124.

The actuator 202 provides positive force to move the flight control surface 122 to a commanded position in response to a command input from the flight crew or an autopilot. The inerter 300 provides for control and damping of displacements of the flight control surface 122. One or more inerters 300 may be included in a flight control system 120. In one example, the one or more inerters 300 may be configured to suppress or prevent control surface flutter as may be aerodynamically-induced at a resonant frequency of the flight control surface 122. For example, the presently-disclosed inerter 300 may be configured to reduce actuator load oscillatory amplitude at resonance (e.g., at a resonant frequency) of up to approximately 20 Hz (e.g., ±5 Hz) which may correspond to the flutter frequency of a flight control surface 122 of an aircraft 100. Additionally or alternatively, the inerter 300 may provide additional functionality for improving the dynamic response of a movable device 124, such as increasing the actuation rate of the movable device 124 and/or preventing position overshoot of a commanded position of the movable device 124, as described in greater detail below.

In one example, the inerter 300 may be configured such that rotation of the flywheel 314 reduces actuator load oscillatory amplitude at resonance of the coupled actuator 202 and movable device 124 by at least approximately 10 percent relative to the actuator load oscillatory amplitude that would otherwise occur using the same actuator 202 without an inerter 300. Advantageously, the presently-disclosed inerter 300 permits the operating bandwidth of the actuator 202 to encompass or match the resonant frequency of the coupled movable device 124 and actuator 202 without the potential for oscillatory response, without the potential for exceeding the strength capability of the mounting system (not shown) of the flight control surface 122 and actuator 202, and/or without the potential for flight control surface 122 deflections that could aerodynamically destabilize the aircraft 100.

The presently-disclosed examples of the inerter 300 allow for a reduction in the overall size and weight of an actuator 202 system without the potential for oscillatory response. More specifically, the inerter 300 allows for a reduction in the inertial load on the actuator 202 which, in turn, allows for a reduction in piston cross-sectional area of the actuator 202 and a decrease in the size and weight of other hydraulic system components including reservoirs, tubing diameter, accumulators, pumps, and other components. In this regard, the inerter 300 increases the power density for a hydraulic actuator system in any application where dynamic response is limited by piston cross-sectional area or load inertia. The presently-disclosed inerter 300 examples may be implemented with hydraulic actuators 204 configured to be operated at a working pressure of at least 5000 psi. For example, the inerter 300 examples may be implemented with hydraulic actuators 204 operated at a working pressure of approximately 3000 psi and, in some examples, the hydraulic actuators 204 may be operated at a working pressure of approximately 8000 psi. A relatively high working pressure of a hydraulic actuator 204 may facilitate a reduction in total flow of hydraulic fluid through the hydraulic system (e.g., flight control system 120) which may enable a reduction in the volumetric requirement for hydraulic fluid reservoirs and accumulators.

In the case of an aircraft 100, the reduced size of the actuators 202 may reduce the amount by which such actuators 202 protrude outside of the outer mold line (not shown) of the aircraft 100 with a resulting decrease in aerodynamic drag. Even further, the presently-disclosed inerter examples may allow for a reduction in the amount of off-take power from the aircraft propulsion units (e.g., gas-turbine engines) which may provide the potential for using higher bypass ratio gas turbine engines such as in commercial aircraft applications. The decrease in the size of the hydraulic system, the reduction in aerodynamic drag, and/or the reduction in off-take power may translate to an increase in aircraft performance including, but not limited to, increased fuel efficiency, range, and/or payload capacity.

Although the presently-disclosed inerter examples are described in the context of a linear hydraulic actuator 204, the inerter 300 may be implemented in other types of actuators 202 including, but not limited to, a rotary hydraulic actuator, an electro-hydraulic actuator (e.g., rotary or linear), a mechanical actuator, an electro-mechanical actuator, and other types of actuators. In one example (see FIG. 21), the electro-mechanical actuator 242 may be a linear electro-mechanical actuator having a threaded shaft 322 coupled to a movable device 124. As described in greater detail below with reference to FIG. 21, the linear electro-mechanical actuator 242 may include an electric actuator motor 244 for causing axial motion of a threaded shaft 322. A flywheel 314 may be threadably engaged to the threaded shaft 322 and may be configured to rotationally accelerate and decelerate in proportion to axial acceleration and deceleration of the threaded shaft 322 during actuation of the movable device 124 by the linear electro-mechanical actuator 242.

It should also be noted that although the presently-disclosed inerter examples are described in the context of an aircraft flight control system 120, any one of the inerters 300 may be implemented in any type of open-loop or closed-loop control system for use in any one of a variety of different applications in any industry, without limitation. In this regard, the presently-disclosed inerters 300 may be implemented in any vehicular application or non-vehicular application. For example, an inerter 300 may be implemented in any marine, ground, air, and/or space application, and in any vehicular or non-vehicular system, subsystem, assembly, subassembly, structure, building, machine, and application that uses an actuator to actuate a movable device.

In some examples, an inerter 300 may be implemented for damping movement of a movable device configured to control the direction of travel of a vehicle. For example, an inerter may be implemented for damping movement of aerodynamic control surfaces of an air vehicle, hydrodynamic control surfaces of a marine vessel, thrust directors including thrust-vectoring nozzles of an aircraft or a launch vehicle (e.g., a rocket), or any other type of mechanical device that influences the direction of travel of a vehicle and which may be susceptible to external vibratory forces. In a specific example of a wheeled vehicle configured to move over land, any one of the presently-disclosed inerter examples may be implemented in a steering system to control or avoid wheel shimmy, such as may occur in a steerable wheel of an aircraft landing gear such as a nose landing gear.

Figure 2:
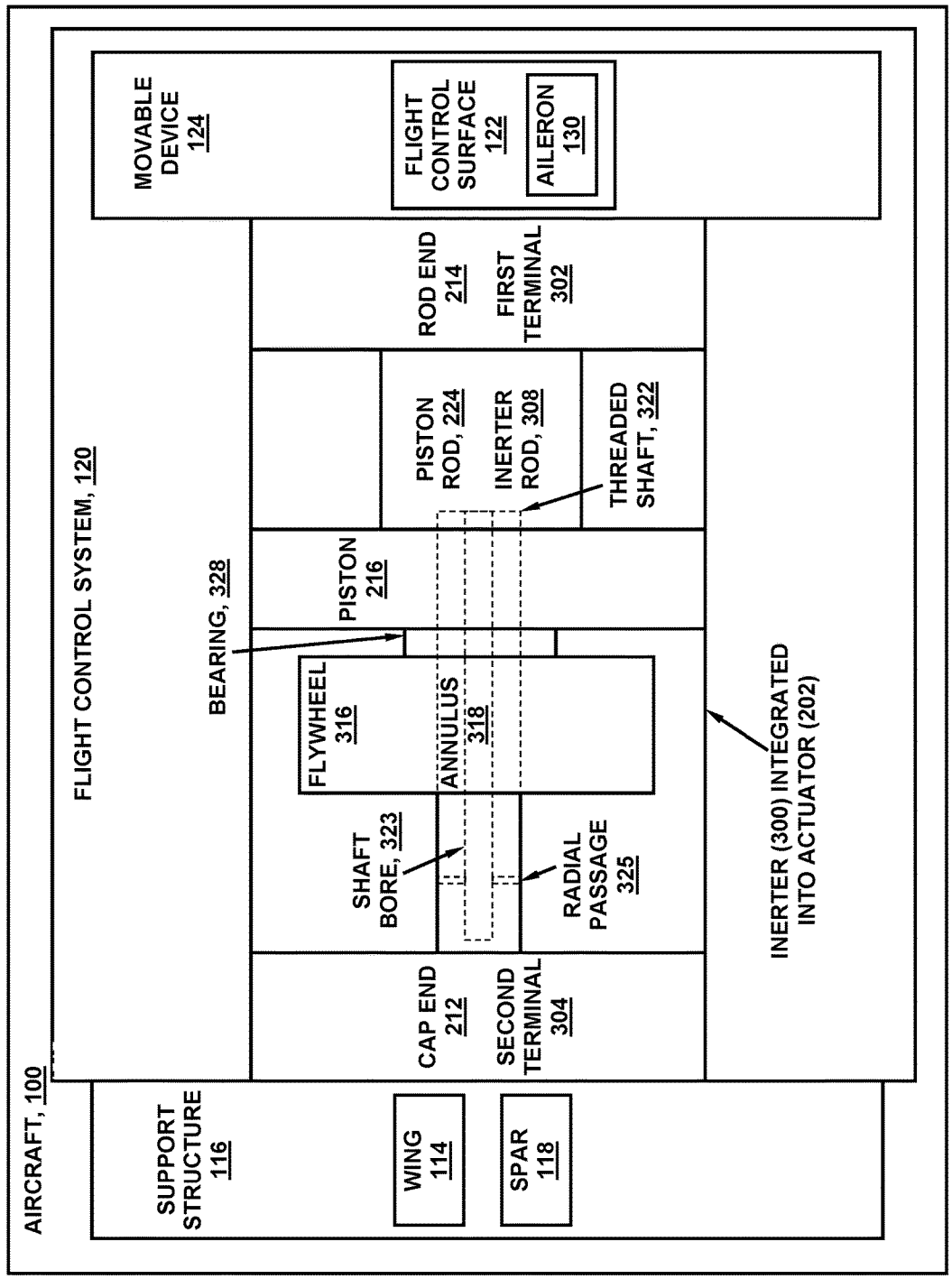
FIG. 2 is a block diagram of an example of an inerter integrated into a hydraulic actuator.

FIG. 2 is a block diagram of an example of an inerter 300 integrated into a hydraulic actuator 204 coupled between a support structure 116 and a flight control surface 122 of a flight control system 120 of an aircraft 100. In the example shown, the actuator 202 is a linear hydraulic actuator 204 having a piston 216 coupled to a rod (e.g., piston rod 224) and axially slidable within a housing (not shown). In the example shown, the flywheel 314 of the inerter 300 is rotatably coupled to the piston 216 at the flywheel annulus 318. The flywheel 314 is threadably coupled to the threaded shaft 322 and configured to rotationally accelerate in proportion to axial acceleration of the piston 216 and rod relative to the threaded shaft 322. However, as mentioned above, the flywheel 314 may be rotatably coupled to the piston 216 (e.g., FIGS. 10-16) or the flywheel 314 may be rotatably coupled to the cap end 212 (e.g., FIGS. 17-20) or rod end 214 of the actuator housing 228.

As mentioned above, the threaded shaft 322 may include a shaft bore 323 open on the free end 324 and having radial passages 325 to allow fluid (e.g., hydraulic fluid) to flow from the cap end chamber 236 at the cap end 212), through the shaft bore 323, and out of the free end 324 of the threaded shaft 322 to allow the fluid to lubricate moving parts of the bearing 328 and/or the flywheel annulus 318. The shaft bore 323 and radial passages 325 may be included in any one of the inerter 300 examples disclosed herein.

In the present disclosure, for examples wherein the inerter 300 is integrated into the actuator 202, the rod end 214 or cap end 212 of the actuator 202 functions as the first terminal 302 of the inerter 300, and the remaining rod end 214 or cap end 212 of the actuator 202 functions as the second terminal 304 of the inerter 300. In this regard, the terms "first terminal" and "second terminal" are non-respectively used interchangeably with the terms "rod end" and "cap end." In addition, for examples where the inerter 300 is integrated into the actuator 202, the term "rod" is used interchangeably with the terms "piston rod" and "inerter rod." Similarly, for examples where the inerter 300 is integrated into the actuator 202, the term "housing" is used interchangeably with the terms "actuator housing" and "inerter housing."

FIG. 3 is a perspective view of an aircraft 100 having one or more inerters 300 for control and/or damping of one or more actuators 202. The aircraft 100 may include a fuselage 102 and a pair of wings 114 extending outwardly from the fuselage 102. The aircraft 100 may include a pair of propulsion units (e.g., gas turbine engines). As mentioned above, each wing 114 may include one or more movable devices 124 configured as flight control surfaces 122 which may be actuated by an actuator 202 damped and/or assisted by an inerter 300. Such flight control surfaces 122 on the wings 114 may include, but are not limited to, spoilers, ailerons, and one or more high-lift devices such as a leading edge slats and/or trailing edge flaps. At the aft end of the fuselage 102, the empennage 104 may include one or more horizontal tails 110 and a vertical tail 106, any one or more of which may include flight control surfaces 122 such as an elevator 112, a rudder 108, or other types of movable devices 124 that may be actuated by an actuator 202 damped and/or assisted by an inerter 300.

FIG. 4 is a top view of a portion of the wing 114 of FIG. 3 illustrating an aileron actuated by a hydraulic actuator 204 located on one end of the aileron and having an inerter 300 located on an opposite and the aileron 130. The aileron 130 may be hingedly coupled to a fixed support structure 116 of the wing 114 such as a spar 118. In FIG. 4, the hydraulic actuator 204 and the inerter 300 are provided as separate components and may each be coupled between the support structure 116 (e.g., the spar 118) and the aileron 130.

FIG. 5 is a sectional view of the wing 114 of FIG. 4 showing an example of a linear hydraulic actuator 204 mechanically coupled between the wing spar 118 and one end of the aileron 130. In the example shown, the rod end 214 of the hydraulic actuator 204 is coupled to a bellcrank 128. The bellcrank 128 is hingedly coupled to the aileron in a manner such that linear actuation of the hydraulic actuator 204 causes pivoting of the aileron about the hinge axis 126. The cap end 212 of the hydraulic actuator 204 is coupled to the wing spar 118.

FIG. 6 is a sectional view of the wing 114 of FIG. 4 and showing an example of an inerter 300 coupled between the wing spar 118 and the aileron 130. As mentioned above, the inerter 300 is located on an end of the aileron opposite the hydraulic actuator 204. The first terminal 302 of the inerter 300 is coupled to a bellcrank 128. The second terminal 304 of the inerter 300 is coupled to the wing spar 118. Due to the hydraulic actuator 204 and the inerter 300 being coupled to the same movable device 124 (i.e., the aileron 130), relative axial acceleration of the cap end 212 and rod end 214 of the actuator 202 causes proportional axial acceleration of the first terminal 302 and second terminal 304 of the inerter 300 resulting in rotational acceleration of the flywheel 314.

FIG. 7 is a partially cutaway sectional view of an example of a double-acting hydraulic actuator 204 having a cap end 212 and a rod end 214 axially movable relative to one another during actuation of the movable device 124. As mentioned above, the rod end 214 and the cap end 212 may be mutually exclusively coupled to the support structure 116 and the movable device 124. For example, the rod end 214 may be coupled to the support structure 116 and the cap end 212 may be coupled to the movable device 124, or the rod end 214 may be coupled to the movable device 124 and the cap end 212 may be coupled to the support structure 116.

In FIG. 7, the piston 216 is coupled to a free end 324 of the piston rod 224 and is axially slidable within the actuator housing 228. The piston 216 divides the actuator housing 228 into a cap end chamber 236 and a rod end chamber 238. The actuator housing 228 of the double-acting hydraulic actuator 204 includes a pair of fluid ports 234 through which pressurized hydraulic fluid enters and leaves the cap end chamber 236 and the rod end chamber 238 chambers for moving the piston 216 within the actuator housing 228. In any of the presently-disclosed examples, the hydraulic actuator 204 may also be configured as a single-acting actuator (not shown) wherein the actuator housing 228 contains a single fluid port 234 for receiving pressurized hydraulic fluid in the actuator housing 228 as a means to move the piston 216 along one direction within the actuator housing 228, and optionally include a biasing member (e.g., a spring—not shown) for moving the piston 216 in an opposite direction.

FIG. 8 is a partially cutaway sectional view of an example of an inerter 300 having an inerter housing 330 containing the flywheel 314 and having an inerter side wall 334 and opposing inerter end walls 332. One inerter end wall 332 may include a housing bore through which the inerter rod 308 extends and terminates at the first terminal 302. The inerter 300 includes a threaded shaft 322 coupled to the inerter end wall 332 located at the second terminal 304. In the example of FIG. 8, the flywheel 314 is coupled to an end of the inerter rod 308 and threadably engaged to the threaded shaft 322. The flywheel 314 rotates in proportion to axial acceleration of the inerter rod 308 and first terminal 302 relative to the threaded shaft 322 and second terminal 304.

Figure 9:
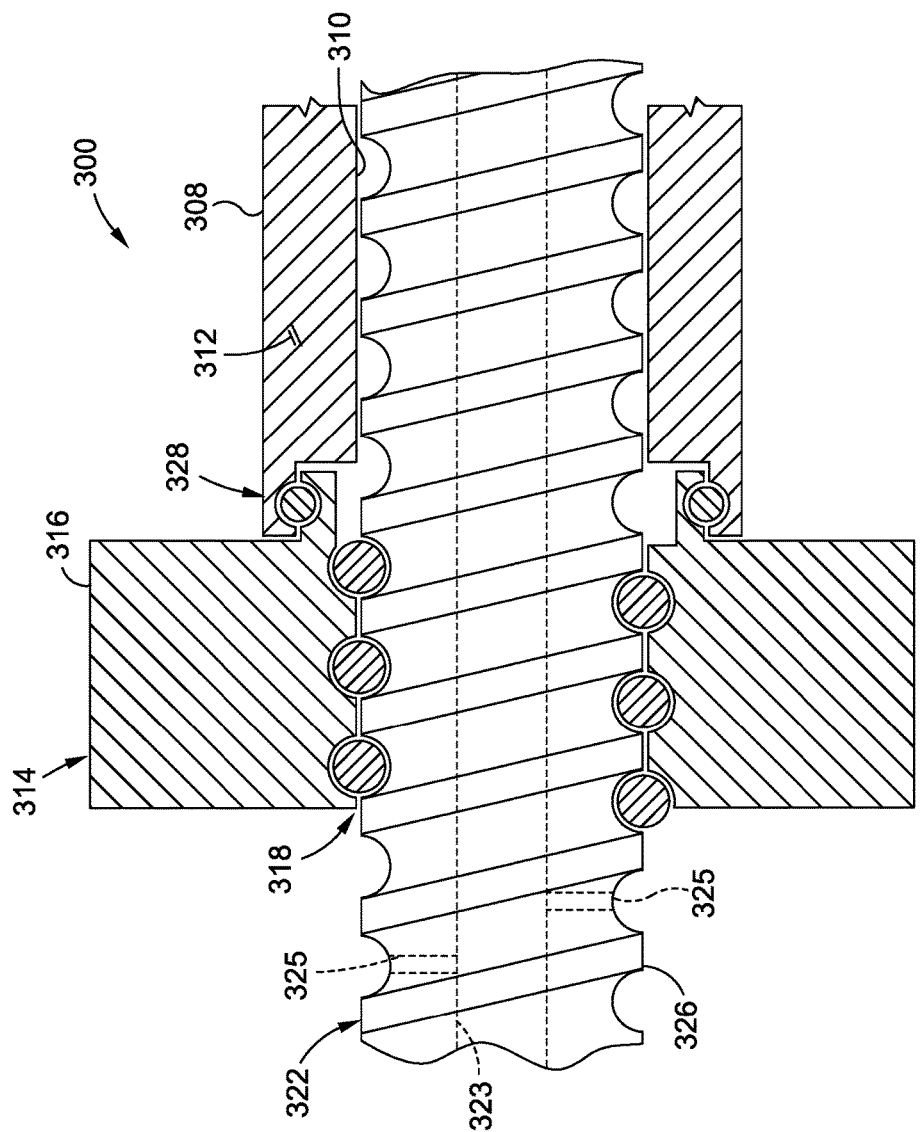
FIG. 9 is a magnified sectional view of the flywheel taken along line 9 of FIG. 8 and illustrating a bearing rotatably coupling the flywheel annulus to the inerter rod and further illustrating the threadable engagement of the flywheel to the threaded shaft.

FIG. 9 is a magnified sectional view of FIG. 8 showing the flywheel 314 coupled to the inerter rod 308 at the flywheel annulus 318. The flywheel annulus 318 is also threadably engaged to the threaded shaft 322. In the example shown, the threaded shaft 322 is configured as a ball screw 326 having helical grooves for receiving ball bearings which couple similarly-configured helical grooves in the flywheel annulus 318 to the ball screw 326 with minimal friction. Although not shown, the flywheel annulus 318 may include a ball nut for circulating the ball bearings coupling the flywheel 314 to the ball screw 326. In another example not shown, the threaded shaft 322 may comprise a lead screw having threads to which the flywheel annulus 318 are directly engaged. As may be appreciated, the flywheel 314 may be configured for engagement to any one of a variety of different types of configurations of threaded shafts, and is not limited to the ball screw 326 example illustrated in FIG. 9.

Also shown in FIG. 9 is an example of a bearing 328 for coupling the flywheel annulus 318 to the inerter rod 308 such that the inerter rod 308 and flywheel 314 may translate in unison as the flywheel 314 rotates due to threadable engagement with the threaded shaft 322. Although the bearing 328 is shown as a ball bearing, the bearing 328 may be provided in any one a variety of different configurations capable of axially coupling the flywheel 314 to the inerter rod 308 with a minimal amount of axial free play. For example, the bearing 328 may be configured as a roller bearing (not shown). In still further examples, the flywheel 314 may be coupled to the inerter rod 308 without a bearing while still allowing the flywheel 314 to rotate during translation of the inerter rod 308 and flywheel 314 relative to the threaded shaft 322.

FIG. 10 is a sectional view of an example of an inerter 300 integrated into a hydraulic actuator 204 having a housing containing a piston 216. The actuator 202 is a double-acting actuator including a pair of fluid ports 234 for receiving pressurized hydraulic fluid in a cap end chamber 236 and a rod end chamber 238 located on opposite sides of the piston 216. The actuator 202 is an unbalanced actuator 206 wherein one of the piston sides 218 has a greater cross-sectional area than the opposite piston side 218. The piston 216 may include a piston 216 seal (e.g., an O-ring seal—not shown) extending around the piston perimeter 220 for sealing the piston perimeter 220 to the actuator side wall 232.

As mentioned above, for examples where the inerter 300 is integrated into an actuator 202, the rod end 214 or the cap end 212 of the actuator 202 functions as the first terminal 302 of the inerter 300, and the remaining rod end 214 or the cap end 212 of the actuator 202 functions as the second terminal 304 of the inerter 300. In the example shown, the flywheel 314 is mounted in the cap end chamber 236 and is rotatably coupled to the piston 216 at the flywheel annulus 318. The flywheel 314 is threadably engaged to the threaded shaft 322 which passes through the piston 216 and extends into the rod bore 310. The flywheel 314 is configured to rotationally accelerate in proportion to axial acceleration of the piston 216 and piston rod 224 relative to the threaded shaft 322.

FIG. 11 shows an example of an inerter 300 having flywheel protrusions 320 for generating viscous damping during rotation of the flywheel 314 when the flywheel 314 is immersed in hydraulic fluid. The flywheel protrusions 320 generate or increase the viscous damping capability of the inerter 300 during rotation of the flywheel 314, and thereby increase the damping capability of the inerter 300.

FIG. 12 is a perspective view of an example of an inerter 300 having a plurality of radially extending flywheel blades circumferentially spaced around the flywheel perimeter 316. During rotation of the flywheel 314, the flywheel blades may generate viscous damping capability and add to the inerting capability of the inerter 300. Although FIG. 12 illustrates the flywheel protrusions 320 as radially-extending flywheel blades, the flywheel 314 may be provided with flywheel protrusions 320 extending from any portion of the flywheel 314 including one or both of the opposing sides of the flywheel 314. In addition, the flywheel protrusions 320 may be provided in any geometric size, shape or configuration, without limitation, and are not limited to flywheel blades.

FIG. 13 is a sectional view of an example of an inerter 300 integrated into a hydraulic actuator 204 configured as a partially-balanced actuator 208. The partially-balanced actuator 208 includes an interior piston 226 coupled to a free end 324 of the threaded shaft 322. The interior piston 226 may be axially slidable within the rod bore 310 and may be rotatably coupled to the end of the threaded shaft 322 such that the interior piston 226 is non-rotatable relative to the rod bore 310 during axial movement of the piston rod 224 relative to the threaded shaft 322. Although not shown, the perimeter of the interior piston 226 may be sealed (e.g., via an O-ring) to the rod wall 312 of the rod bore 310. The inclusion of the interior piston 226 may reduce the total volume of hydraulic fluid required to fill the cap end chamber 236 during extension of the piston rod 224 relative to the increased volume of hydraulic fluid required to fill the cap end chamber 236 for examples (e.g., FIG. 8) lacking an interior piston 226.

FIG. 14 is a partially cutaway sectional view of an example of an inerter 300 integrated into a hydraulic actuator 204 configured as a balanced actuator 210 having opposing piston sides 218 with substantially equivalent cross-sectional areas. The housing may include a separator wall 240 separating the portion of the housing containing the flywheel 314 from the portion of the housing containing the piston 216. A cap end chamber 236 is located on one of the piston sides 218 and the rod end chamber 238 is located on the opposite piston side 218. The piston 216 may be mounted on the piston rod 224. In FIG. 14, one end of the piston rod 224 extends through the actuator end wall 230 and terminates at the rod end 214 (e.g., the first terminal 302). An opposite end of the piston rod 224 extends through the separator wall 240. The flywheel 314 is rotatably coupled to the piston rod 224 in a manner as described above.

Figure 15:
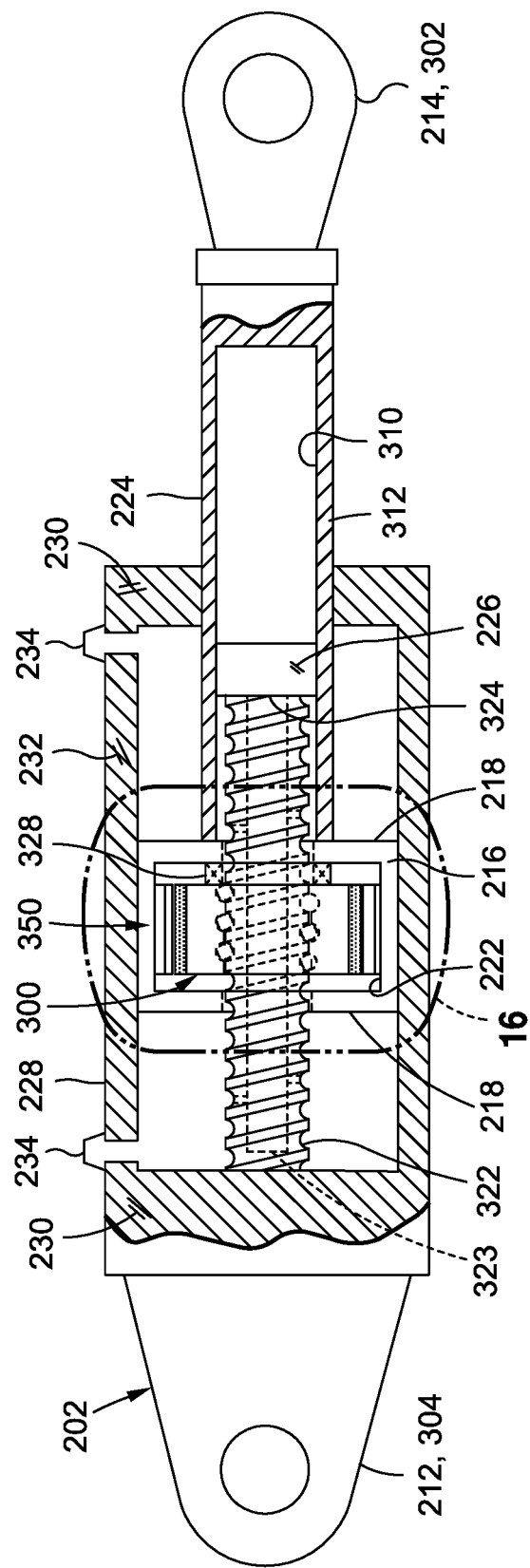
FIG. 15 is a sectional view of an example of an inerter integrated into a hydraulic actuator and wherein the flywheel is rotatably housed within the piston of the hydraulic actuator and including an electric flywheel motor and a brake for actively controlling rotation of the flywheel.

FIG. 15 is a partially cutaway sectional view of an example of an inerter 300 having an electric flywheel motor 350 integrated into a hydraulic actuator 204. The flywheel motor 350 may facilitate active control of flywheel 314 rotation using electromotive force from the integrated flywheel motor 350. Active control may include using the flywheel motor 350 to apply a torque to the flywheel 314 to resist or aid the torque that is generated by the flywheel 314 due to axial acceleration of the first terminal 302 relative to the second terminal 304. The flywheel motor 350 may be configured to provide active damping and/or active braking of the actuator 202 and the load inertia.

Figure 16:
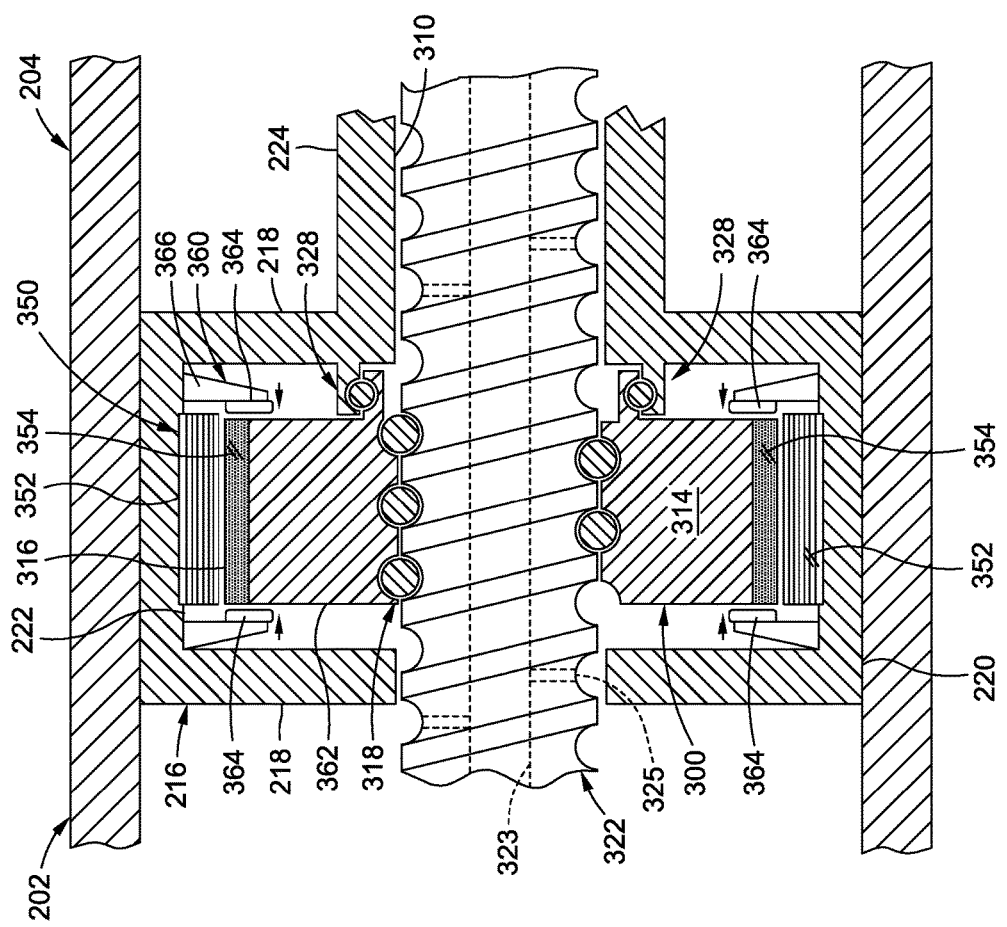
FIG. 16 is a magnified sectional view of the flywheel and piston taken along line 16 of FIG. 15 and illustrating the electric flywheel motor having permanent magnets mounted to the flywheel perimeter and windings mounted to the piston inner wall.

FIG. 16 is a magnified sectional view of FIG. 15 showing the flywheel 314 rotatably coupled to and contained within a generally hollow piston 216 which is actually slidable within the actuator housing 230. Also shown in the flywheel motor 350 incorporated into the flywheel 314 and the piston 216 and configured to actively control rotation of the flywheel 314 in correspondence with relative axial movement of the rod and threaded shaft 322. The flywheel motor 350 may be operated in a manner to accelerate and/or decelerate the flywheel 314 by applying a torque to the flywheel 314 either in correspondence with (e.g., the same direction as) or in opposition to the direction of rotation of the flywheel 314. In this manner, the flywheel motor 350 may apply a torque to the flywheel 314 to resist or aid the flywheel torque generated due to axial acceleration of the first terminal 302 relative to the second terminal 304

In the example of FIG. 16, the flywheel motor 350 is a permanent magnet direct-current (DC) motor having one or more permanent magnets 354 mounted to the flywheel 314. For example, a plurality of permanent magnets 354 may be circumferentially spaced around the flywheel perimeter 316. In addition, the flywheel motor 350 may include a plurality of windings 352 mounted to the piston 216. In one example, a plurality of windings 352 may be circumferentially spaced around the piston inner wall 222 (e.g., FIGS. 15-16). In another example, a plurality of windings 352 may be circumferentially spaced around the side wall 232 of the housing (e.g., FIGS. 19-20) as described below. In other examples, the flywheel motor 350 may be a brushless DC motor or some other motor configuration, and is not limited to a permanent magnet DC motor configuration as shown in FIGS. 15-16 and 19-20. In an example not shown, a linear position sensor may be included with the actuator 202 to sense the linear position of the piston 216 and generate a signal representative of the linear piston position for commutating the flywheel motor 350 in correspondence with the piston position.

As mentioned above, the flywheel motor 350 in FIGS. 15-16 may be configured to assist or aid in rotating the flywheel 314 for a commanded direction of motion of the movable device 124. For example, the flywheel motor 350 may provide a torque to accelerate the flywheel 314 at the start of motion of the movable device 124 toward a commanded position. The torque applied to the flywheel 314 by the flywheel motor 350 may be approximately equal in magnitude to the torque required to rotationally accelerate the flywheel 314 due to axial acceleration of the threaded shaft 322 relative to the rod. By using the flywheel motor 350 to remove the torque required to rotationally accelerate the flywheel 314, the piston 216 may move more quickly to a commanded position than if the flywheel motor 350 did not accelerate the flywheel 314. In this manner, the flywheel motor 350 may allow faster responsiveness of a movable device 124 than a conventional actuator 202. The level of damping provided by an inerter 300 having active control of the flywheel 314 may be greater than the damping that is feasible in a closed-loop control system without active control due to the risk of control system instability. Although FIGS. 15-16 illustrate a flywheel motor 350 incorporated into an inerter 300 integrated with an actuator 202, a flywheel motor 350 may be incorporated into an inerter 300 that is a separate component from the actuator 202 (e.g., FIGS. 4-8).

In a further example of active control, the flywheel motor 350 may be operated in a manner to provide a torque to decelerate the flywheel 314 as the movable device 124 approaches a commanded position. In this regard, the flywheel motor 350 may be operated as a brake to oppose the flywheel torque generated by the axial deceleration of the threaded shaft 322 relative to the piston rod 224. Actively controlling flywheel 314 rotation in this manner may prevent or limit position overshoot of the movable device 124 and thereby increase the stability of the movable device 124. In such an arrangement, the actuator 202 and inerter 300 may be configured with a failure mode that ensures that without active motor control, the actuator 202 is capable of exhibiting a desired damped response in a manner preventing underdamping of the movable device 124. An inerter 300 having a flywheel motor 350 for active control may be connected to the movable device 124 without being part of the actuator 202 such that in the event of a disconnect of the actuator 202 from the movable device 124 or in the event of a failure of the actuator 202 to hold the load of the movable device 124, the flywheel motor 350 may be operated in a manner preventing underdamped movement of the movable device 124 for the given failure mode.

Referring still to FIG. 16, in another example of active control, the flywheel motor 350 may include a brake 360 configured to provide dynamic braking of the flywheel 314. In this regard, the brake 360 may be operated in a manner to decelerate the flywheel 314 or to increase existing deceleration of the flywheel 314. For examples that include a flywheel motor 350, the brake 360 may be operated in a manner to increase existing deceleration of the flywheel 314 caused by rotational drag of the flywheel motor 350. In addition, the flywheel motor 350 may be operated in a manner to oppose disturbances (e.g., undesirable motion) of the actuator 202.

In the example of FIG. 16, the brake 360 may be configured as a disc brake having brake pads 364. The flywheel 314 may function as a brake rotor against which the brake pads 364 may be frictionally engaged during braking. In other examples not shown, a separate brake rotor may be provided which may be directly or indirectly coupled to the flywheel 314. In the example shown, a hydraulic brake cylinder (not shown) may be included to actuate the brake pads 364 into frictional engagement with one or both of the opposing axial faces 362 (e.g., planar faces) of the flywheel 314 for decelerating the flywheel 314. Preferably, the brake 360 may include at least two pairs of opposing brake pads 364 located on diametrically opposing sides of the brake rotor. Each pair of brake pads 364 may be held in position by a bracket 366. Although the brake 360 is described and illustrated as a disc brake, the inerter 300 may incorporate any one or more different types of brakes such as a drum brake or any other type of brake capable of decelerating the flywheel 314.

Figure 17:
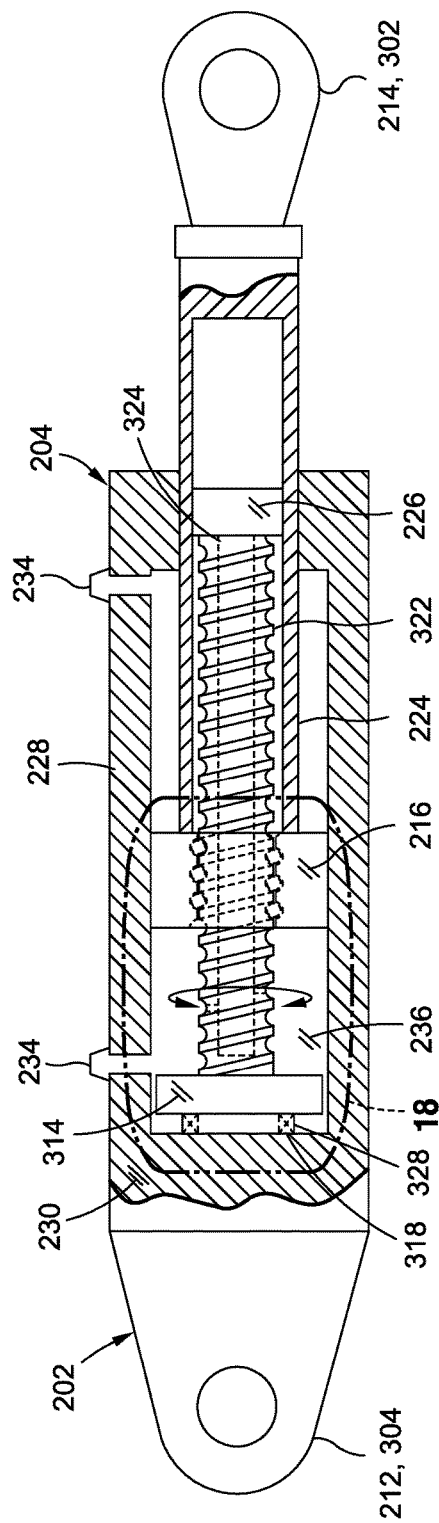
FIG. 17 is a sectional view of an example of an inerter integrated into a hydraulic actuator and wherein the flywheel and threaded shaft are rotatably coupled to the actuator end wall and the piston fixedly coupled to the rod.

Referring to FIG. 17, shown is a partially cutaway sectional view of another example of an inerter 300 integrated into a hydraulic actuator 204. The flywheel 314 is rotatably coupled or attached to the actuator end wall 230 which may be coupled to the second terminal 304. The piston 216 is fixedly coupled or attached to the piston rod 224 which extends from the piston 216 through the actuator end wall 230 and is coupled to the first terminal 302. In an alternative example not shown, the flywheel 314 may be rotatably coupled to the actuator end wall 230 which is attached to the first terminal 302, and the piston rod 224 may be coupled to the second terminal 304.

Figure 18:
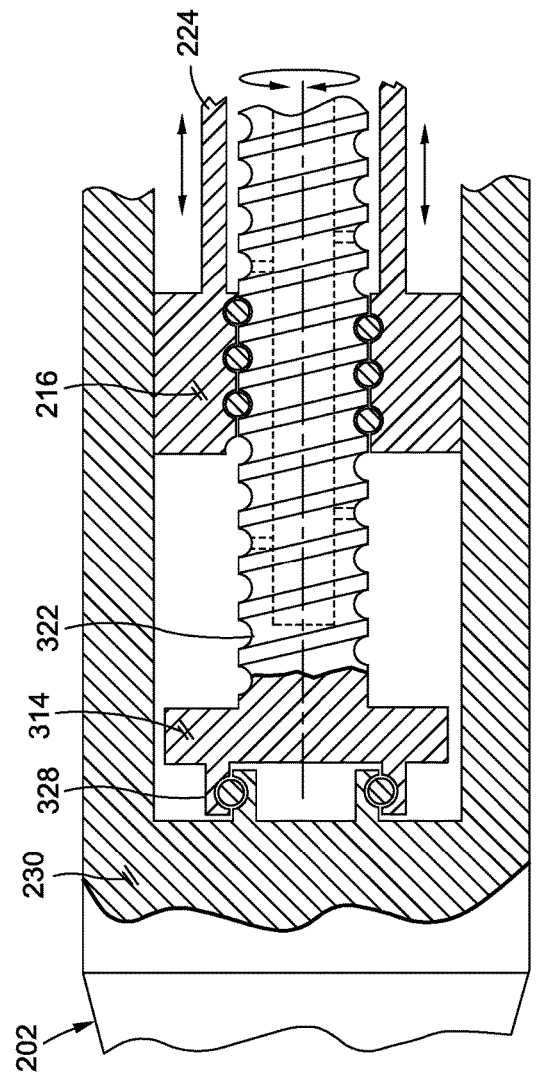
FIG. 18 is a magnified sectional view of the flywheel and piston taken along line 18 of FIG. 17 and illustrating the flywheel annulus rotatably coupled to the actuator end wall and the piston threadably engaged to the threaded shaft in a manner such that linear translation of the rod relative to the threaded shaft causes rotation of the flywheel and threaded shaft.

FIG. 18 is a magnified sectional view of FIG. 17 illustrating the flywheel annulus 318 rotatably coupled by a bearing 328 to the actuator end wall 230. The threaded shaft 322 is fixedly coupled to the flywheel 314 and is rotatable in unison with the flywheel 314. As mentioned above, the piston 216 is fixedly coupled to the piston rod 224 and threadably engaged to the threaded shaft 322 in a manner such that linear translation of the piston rod 224 relative to the threaded shaft 322 causes rotation of the flywheel 314 and threaded shaft 322 in unison. As indicated above, axial movement of the threaded shaft 322 relative to the piston rod 224 may be in correspondence with actuation of the movable device 124 by the actuator 202.

Figure 19:
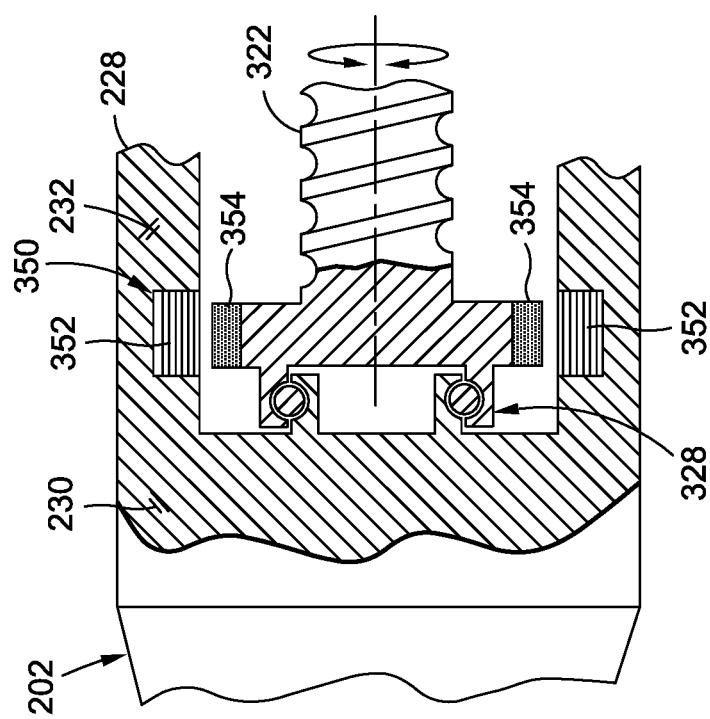
FIG. 19 is a sectional view of an example of a flywheel rotatably coupled to the actuator end wall and having an electric flywheel motor including permanent magnets mounted to the flywheel perimeter and windings mounted to the housing side wall of the actuator.

FIG. 19 illustrates an example of a flywheel 314 rotatably coupled to the actuator end wall 230 and incorporating a flywheel motor 350 for active control of the rotation of the flywheel 314 in a manner as described above. The flywheel motor 350 may include permanent magnets 354 mounted to the flywheel perimeter 316. For example, as described above with regard to FIG. 16, a plurality of permanent magnets 354 may be circumferentially spaced around the flywheel perimeter 316. FIG. 19 also shows a plurality of windings 352 circumferentially spaced around the actuator side wall 232 of the actuator housing 228.

Figure 20:
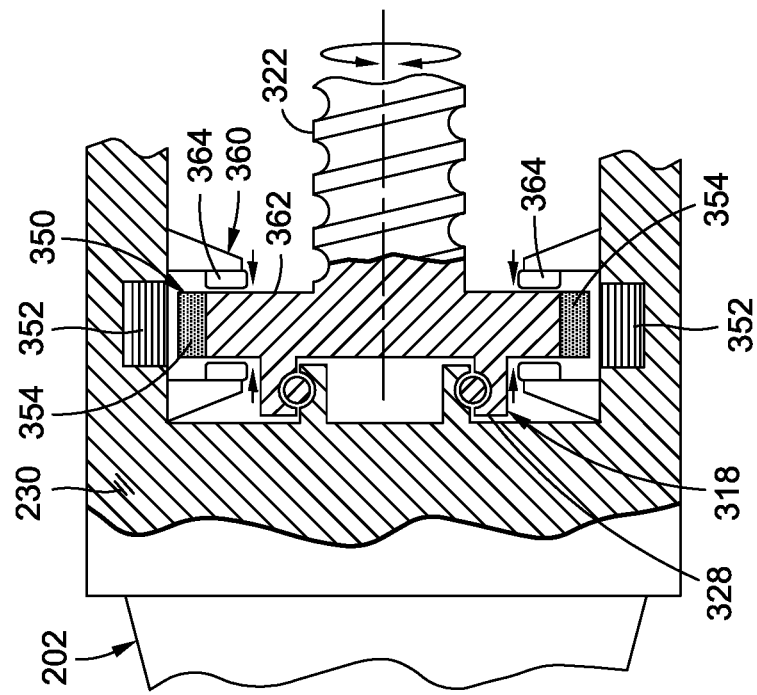
FIG. 20 is a sectional view of a further example of a flywheel having an electric flywheel motor and further including a brake configured to provide dynamic braking of the flywheel.

FIG. 20 illustrates an example of a flywheel 314 including a brake 360 configured to provide dynamic braking of the flywheel 314. In the example shown, the brake 360 is configured as a disc brake having one or more pairs of brake pads 364 for frictionally engaging opposing axial faces 362 of the flywheel 314. The brake 360 in FIG. 20 may be configured and operated similar to the arrangement illustrated in FIG. 16 and described above.

Figure 21:
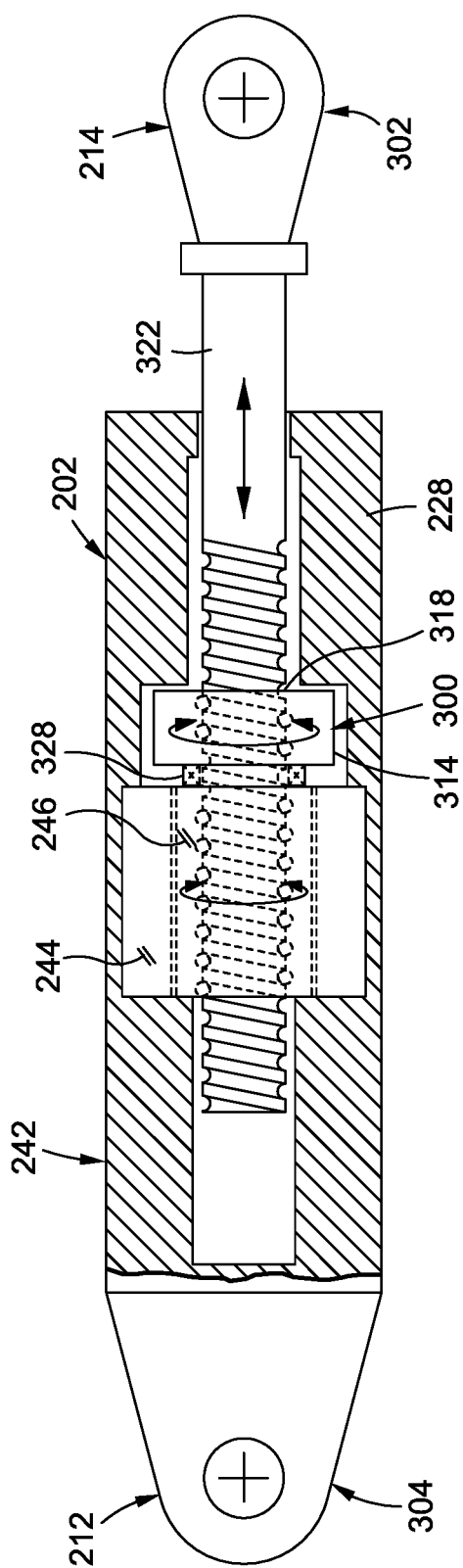
FIG. 21 is a sectional view of an example of an inerter integrated into a linear electro-mechanical actuator and illustrating the flywheel rotatably coupled to an actuator motor and threadably engaged to a threaded shaft.

FIG. 21 illustrates an example of an inerter 300 integrated into a linear electro-mechanical actuator 242. The electro-mechanical actuator 242 may extend between a support structure 116 (FIG. 2) and a movable device 124 (FIG. 2). The electro-mechanical actuator 242 may include an electric actuator motor 244 supported by the actuator housing 228. The first terminal 302 may be coupled to a movable device 124. The electro-mechanical actuator 242 may include a second terminal 304 which may be coupled to a support structure 116. Alternatively, the first terminal 302 may be coupled to the support structure 116 and the second terminal 304 may be coupled to the movable device 124.

The electro-mechanical actuator 242 may include a threaded shaft 322 (e.g., an Acme-threaded shaft, a ball screw, etc.) extending through the actuator motor 244 and terminating at the first terminal 302. The actuator motor 244 may be operably coupled to the threaded shaft 322 by a motor-shaft coupler 246 which may be threadably engaged to the threaded shaft 322. Operation of the actuator motor 244 may cause axial motion of the threaded shaft 322 for actuating the movable device 124. In this regard, the threaded shaft 322 may axially move in proportion (e.g., in magnitude and direction) to angular displacement of the actuator motor 244. A flywheel 314 may be threadably engaged to the threaded shaft 322. In addition, the flywheel annulus 318 may be rotatably coupled to the actuator motor 244 via a bearing 328 such that axial acceleration of the threaded shaft 322 causes rotational acceleration of the flywheel 314. The flywheel 314 may be configured to rotationally accelerate and decelerate in proportion to axial acceleration and deceleration of the threaded shaft 322 (e.g., relative to the actuator motor 244) during actuation of the movable device 124.

In this regard, rotation of the flywheel 314 during actuation of the electro-mechanical actuator 242 of FIG. 21 may provide any one or more of the advantages described herein for improving the dynamic response of the movable device 124 during actuation by the electro-mechanical actuator 242. For example, the flywheel 314 may reduce actuator load oscillatory amplitude at resonance of the coupled electro-mechanical actuator 242/movable device 124. In addition, although not shown in FIG. 21, a flywheel motor 350 (e.g., FIG. 16) and/or a dynamic brake 360 (FIG. 16) may optionally be included with the flywheel 314 to allow for active control of the rotation of the flywheel 314 using any one or more of the flywheel control techniques described herein.

Figure 22:
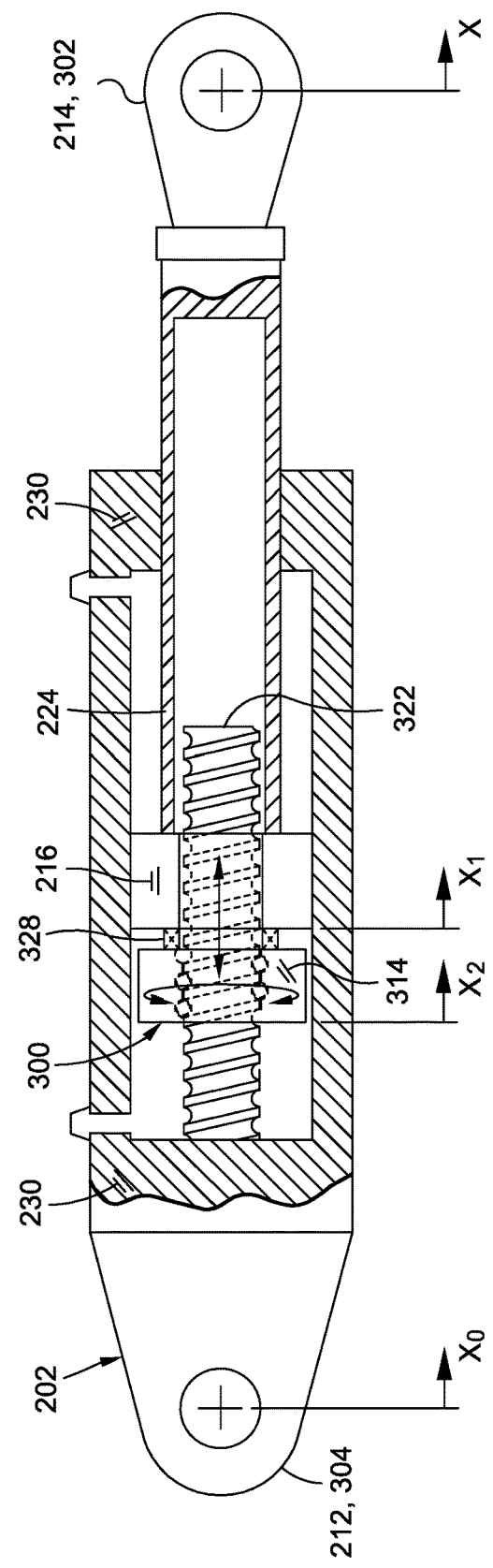
FIG. 22 is a sectional view of an example of an inerter integrated into a hydraulic actuator and illustrating the notations x, $x_0$, $x_1$, and $x_2$ respectively denoting reference points for translation of the rod end, the cap end, the piston, and the flywheel wherein the notations are used in the derivation of a transfer function characterizing the response of an actuator having an integrated inerter.

FIG. 22 is a sectional view of an example of an inerter 300 integrated into a hydraulic actuator 204 as described above and illustrated in FIG. 10. FIG. 22 includes the notations x, $x_0$, $x_1$, and $x_2$ respectively denoting reference points for translation of the rod end 214, the cap end 212, the piston 216, and the flywheel 314. The notations x, $x_0$, $x_1$, and $x_2$ are parameters that are used in a below-described derivation of a transfer function $$\frac{X(s)}{F(s)}$$

(Equation 220) mathematically characterizing the response of the apparatus of FIG. 22. Table 1 includes a listing of the parameters used in the derivation of the transfer function. Included with each listed parameter is an indication of the physical type of the parameter and a brief description of the parameter.

$F = F_1 + F_2$ (Equation 100)

The torque $T_2$ developed by the flywheel 314 may be determined using Equation 110 as the sum of the product of the flywheel rotational inertia J and flywheel rotational acceleration $\ddot{\theta}$ and the product of a flywheel damping coefficient B and the flywheel rotational velocity $\dot{\theta}$:

$T_2 = J\ddot{\theta} + B\dot{\theta}$ (Equation 110)

The flywheel reacted force $F_2$ may be computed using equation 120 as the product of the flywheel torque $T_2$ and the thread rate r (e.g., thread pitch) of the threaded shaft 322. The thread rate may be described as the linear distance of travel of the flywheel 314 per revolution:

$F_2 = r(J\ddot{\theta} + B\dot{\theta})$ (Equation 120)

The rotation of the flywheel 314 may be characterized by the flywheel angular displacement or rotational angle $\theta$, rotational velocity $\dot{\theta}$, and rotational acceleration $\ddot{\theta}$, as respectively represented by Equations 130, 140, and 150. The flywheel rotational angle $\theta$ is the product of the thread rate r and the linear distance of flywheel translation $x_2$ as represented by Equation 130. The parameter c is a constant representing a linear offset relative to a common reference. The flywheel rotational velocity $\dot{\theta}$ is the product of the thread rate r and the linear velocity $\dot{x}_2$ of the flywheel 314 as represented by Equation 140. The flywheel rotational acceleration $\ddot{\theta}$ is the product of the thread rate r and the linear acceleration $\ddot{x}_2$ of the flywheel 314 as represented by Equation 150.

$\theta + c = rx_2$ (Equation 130)

$\dot{\theta} = r\dot{x}_2$ (Equation 140)

$\ddot{\theta} = r\ddot{x}_2$ (Equation 150)

TABLE 1

| Parameter | Physical type | Description |
| --- | --- | --- |
| F | force | actuator reacted force (newton) |
| $F_1$ | force | piston reacted force (newton) |
| $F_2$ | force | flywheel reacted force (newton) |
| $F_3$ | force | flywheel to piston compliance force (newton) |
| $T_2$ | torque | flywheel acceleration torque (newton-meter) |
| x | translation | actuator rod end translation reference (meter) |
| $x_1, \dot{x}_1, \ddot{x}_1$ | translation | piston translation reference (meter) |
| $x_2, \dot{x}_2, \ddot{x}_2$ | translation | flywheel translation transformed from rotation (meter) |
| $x_0, \dot{x}_0, \ddot{x}_0$ | translation | actuator cap end translation reference (meter) |
| $\theta, \dot{\theta}, \ddot{\theta}$ | rotation | flywheel rotation reference (radian) |
| J | mass moment of inertia | flywheel inertia in rotation (kilogram-meter$^2$) |
| B | damping coefficient | flywheel torque resisting $\dot{\theta}$ (newton-meter/radian/s) |
| Z | stiffness | flywheel rotational stiffness (radian/newton-meter) |
| M | mass | actuator reacted inertia at rod end (kilogram) |
| C | damping coefficient | actuator force resisting $\dot{x}$ (newton/meter/s) |
| K | stiffness | actuator stiffness (meter/newton) |
| r | thread rate | revolutions per translation (radian/meter) |
| $\omega_n$ | natural frequency | 2$^{nd}$ order model characteristic (radian/second) |
| $\zeta$ | damping factor | 2$^{nd}$ order model characteristic (no unit) |
| c | constant | zero offset to a common reference |

Equations 100 to 210 inclusive are the assumptions behind the derivation of the transfer function of Equation 220. Referring to the example apparatus of FIG. 22, the total reacted force F (e.g., at the rod end 214) may be computed as the sum of the piston 216 reacted force $F_1$ and the flywheel 314 reacted force $F_2$ as shown in Equation 100, wherein the sign of $F_1$ and $F_2$ are the same from a disturbance rejection sense:

A flywheel 314 to piston 216 compliance force $F_3$ may be computed using Equation 160 as the product of the flywheel rotational stiffness Z and the difference between flywheel translation $x_2$ and piston translation $x_1$. For the example apparatus of FIG. 22 wherein the inerter (e.g., the flywheel 314) is integrated into the actuator 202, the flywheel 314 moves with the piston 216 such that the flywheel translation $x_2$ and the piston translation $x_1$ are the same, as indicated below in Equation 190. In this regard, the piston compliance force $F_3$ is zero (0) due to the assumption that $x_2=x_1$ as indicated below in Equation 190.

$$F_3 = Z(x_2 - x_1) \quad \text{(Equation 160)}$$

Substituting Equations 140 and 150 for flywheel velocity $\dot{\theta}$ and flywheel acceleration $\ddot{\theta}$ into Equation 120, the flywheel reacted force $F_2$ may be expressed as follows:

$$F_2 = r^2(J\ddot{x}_2 + B\dot{x}_2) \quad \text{(Equation 170)}$$

The piston reacted force $F_1$ may be computed as the sum of the product of the actuator (e.g., the piston) reacted inertia M at the rod end 214 and the piston acceleration $\ddot{x}_1$, the product of the actuator (e.g., the piston) resisting force C and the piston velocity $\dot{x}$, and the product of the actuator stiffness K and the piston displacement $x_1$, as shown in Equation 180:

$$F_1 = M\ddot{x}_1 + C\dot{x}_1 + Kx_1 \quad \text{(Equation 180)}$$

As mentioned above, for the example shown in FIG. 22 wherein the inerter (e.g., the flywheel 314 and threaded shaft 322) is integrated into the actuator 202 such that the flywheel 314 and the piston 216 move in unison, the flywheel translation $x_2$ and the piston translation $x_1$ are the same as represented by Equation 190. In addition the rod end 214 and the piston 216 move in unison as represented by Equation 200. The cap end 212 at $x_0$ is assumed to be fixed (e.g., non-translating) as represented by Equation 210.

$$x_2 = x_1 \quad \text{(Equation 190)}$$

$$\dot{x}_1 = \dot{x} \quad \text{(Equation 200)}$$

$$\ddot{x}_0 = \dot{x}_0 = x_0 = 0 \quad \text{(Equation 210)}$$

Performing a Laplace transform on a differential equation (not shown) representing the natural frequency of the example apparatus shown in FIG. 22, the resulting transfer function $$\frac{X(s)}{F(s)}$$

is expressed as shown in Equation 220 wherein X(s) represent the response of the apparatus of FIG. 22 and F(s) represents the input to the apparatus:

$$\frac{X(s)}{F(s)} = \frac{\frac{1}{r^2 J + M}}{s^2 + \frac{r^2 B + C}{r^2 J + M} s + \frac{K}{r^2 J + M}} \quad \text{(Equation 220)}$$

The natural frequency $\omega_n$ of oscillation of the example apparatus of FIG. 22 may be expressed as shown in Equation 230 wherein K is the actuator stiffness, r is the thread rate, and J is the flywheel rotational inertia, as described above.

$$\omega_n = \left(\frac{K}{r^2 J + M}\right)^{1/2} \quad \text{(Equation 230)}$$

Equation 240 represents the damping factor $\zeta$ of the example apparatus of FIG. 22 which characterizes the decay in oscillatory response to the input (e.g., flutter of a flight control surface).

$$\zeta = \frac{r^2 B + C}{2(K(r^2 J + M))^{1/2}} \quad \text{(Equation 240)}$$

Figure 23:
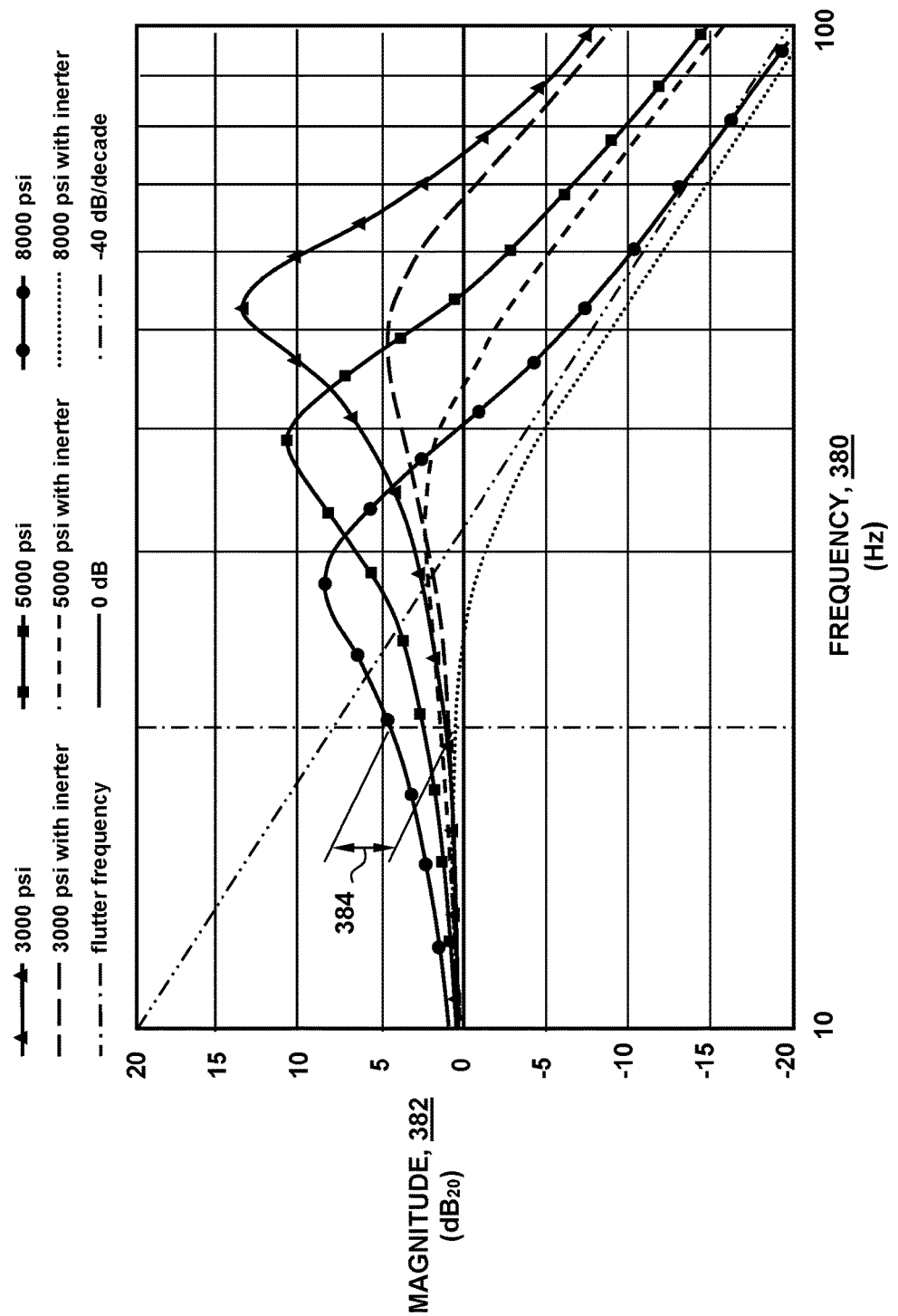
FIG. 23 is a graph plotting frequency vs. magnitude (e.g., amplitude) for an actuator operating under a working pressure of 3000 psi, 5000 psi, and 8000 psi, and illustrating a reduction in amplitude for the actuator damped by an inerter relative to the amplitude of the actuator undamped by an inerter.

FIG. 23 is a graph plotting frequency 380 vs. magnitude 382 (amplitude) of the oscillatory response to a dynamic load for an actuator 202 operating under three (3) different working pressures (3000 psi, 5000 psi, and 8000 psi). The vertical centerline represents a flutter frequency of 20 Hz corresponding to the dynamic load. The plots of FIG. 23 illustrate the reduction in response amplitude 384 provided by the actuator 202 with integrated inerter 300 of FIG. 22, relative to the response amplitude for the same actuator operating without an inerter. The reduction in response amplitude represents an optimization based on setting the response amplitude at the flutter frequency for the actuator 202 operating at 8000 psi with an inerter 300 equal to the response amplitude at the flutter frequency for the actuator 202 operating at 3000 psi without the inerter 300, and optimizing the thread pitch r of the threaded shaft 322, the flywheel rotational inertia J, and the damping factor $\zeta$ (Equation 240). For the actuator 202 operating at 8000 psi, the inerter 300 facilitates a reduction in response amplitude 384 of almost 5 dB at the flutter frequency of 20 Hz.

Figure 24:
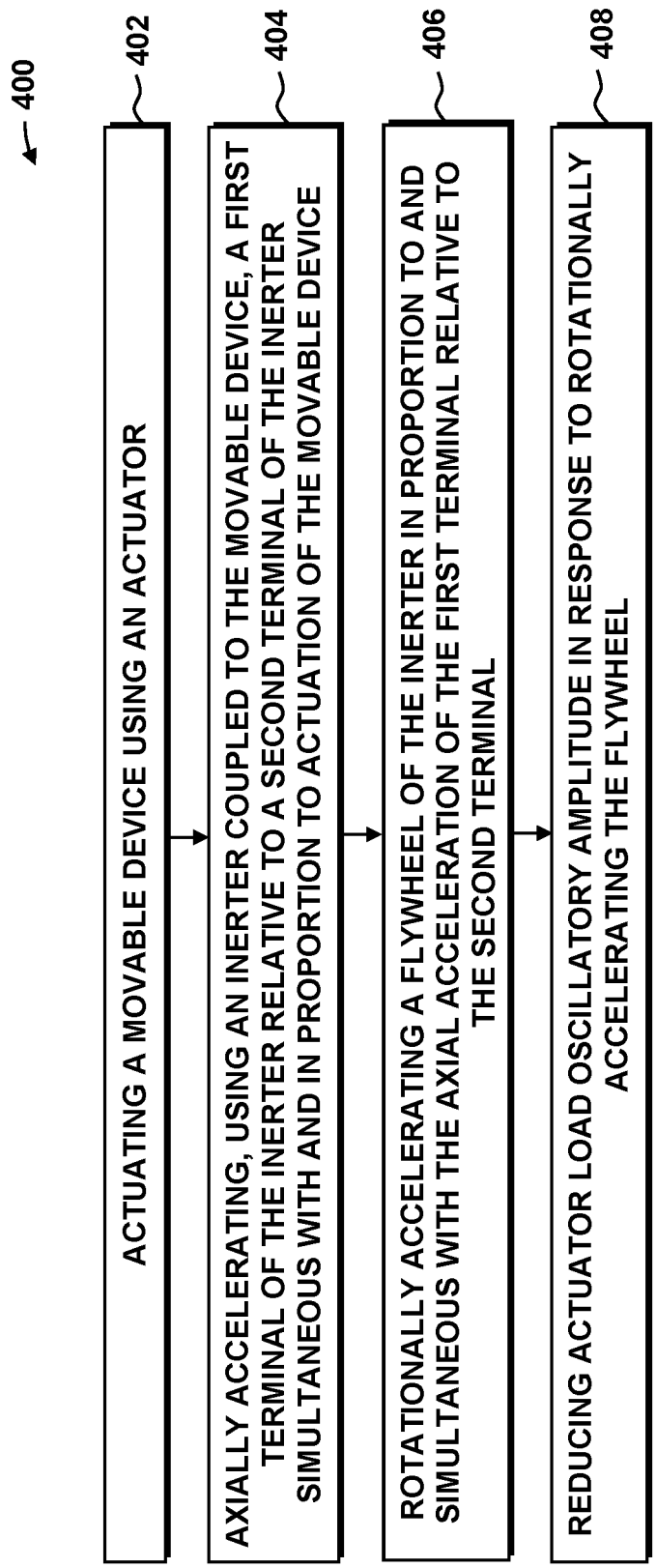
FIG. 24 is a flowchart having one or more operations that may be included in method of damping an actuator using an inerter.

FIG. 24 is a flowchart having one or more operations that may be included in a method 400 of damping an actuator 202 using an inerter 300. As mentioned above, the damping of the actuator 202 may comprise reducing actuator load oscillatory amplitude using inerter 300. As indicated above, in some examples, the inerter 300 may be a separate component from the actuator 202 and coupled to the same movable device 124 as the actuator 202 (e.g., FIGS. 1 and 4-9). In other examples, the inerter 300 may be integrated into the actuator 202 (e.g., FIGS. 2 and 10-22).

Step 402 of the method 400 includes actuating the movable device 124 using an actuator 202. In the example of a flight control system 120 of an aircraft 100, the method may include using a linear actuator such as a linear hydraulic actuator 204 or a linear electro-mechanical actuator 242. For example, FIGS. 4-6 illustrate a linear hydraulic actuator 204 configured to actuate an aileron 130 pivotably mounted to a wing 114 of an aircraft 100. However, as mentioned above, the movable device 124 may be any type of movable device that may be actuated by an actuator 202.

Step 404 of the method 400 includes axially accelerating, using an inerter 300 coupled to the movable device 124, the first terminal 302 of the inerter 300 relative to the second terminal 304 of the inerter 300. As indicated above, the inerter 300 may be coupled between the support structure 116 and the movable device 124 (e.g., FIGS. 4 and 6). For example, the first terminal 302 may be coupled to the movable device 124 and the second terminal 304 may be coupled to the support structure 116, or the first terminal 302 may be coupled to the support structure 116 and the second terminal 304 may be coupled to the movable device 124. Alternatively, the inerter 300 may be integrated into the actuator 202 (e.g., FIGS. 10-21) which may be coupled between the support structure 116 and the movable device 124. In such examples, as mentioned above, the rod end 214 or the cap end 212 of the actuator 202 functions as (e.g., is one and the same as) the first terminal 302 of the inerter 300, and the remaining rod end 214 or cap end 212 of the actuator 202 functions as (e.g., is one and the same as) the second terminal 304 of the inerter 300.

Step 406 of the method 400 includes rotationally accelerating the flywheel 314 simultaneous with the axial acceleration of the first terminal 302 relative to the second terminal 304. Because the inerter 300 and the actuator 202 are coupled to the same movable device 124 (e.g., FIGS. 1 and 4-9) or because the inerter 300 is integrated into the actuator 202 (e.g., FIGS. 2 and 10-21), the axial acceleration of the first terminal 302 relative to the second terminal 304 is simultaneous with and in proportion to the actuation of the movable device 124 by the actuator 202. In this regard, the flywheel 314 rotationally accelerates and decelerates in proportion to the axial acceleration and deceleration of the first terminal 302 relative to the second terminal 304 in correspondence with the actuation of the movable device 124 by the actuator 202.

Step 408 of the method 400 includes damping the movement of the actuator 202 in response to rotating the flywheel 314. In one example, the method may include reducing actuator load oscillatory amplitude of the movable device 124 in response to rotationally accelerating the flywheel 314. Regardless of whether the inerter 300 is a separate component from the actuator 202 or the inerter 300 is integrated into the actuator 202, the method may include rotationally accelerating the flywheel 314 in a manner reducing actuator load oscillatory amplitude at resonance of the movable device 124 coupled to the actuator 202. In one example, the method may include reducing actuator load oscillatory amplitude by at least 50% relative to the oscillatory amplitude for the movable device 124 actuated by the same actuator but without the inerter, as mentioned above. The inerter 300 may be configured to reduce actuator load oscillatory amplitude at a resonant frequency of up to approximately 20 Hz (e.g., ±5 Hz). The movable device 124 may be a flight control surface 122 (e.g., a hydraulically-actuated aileron 130) of an aircraft 100 and the resonance (e.g., the resonant frequency) may correspond to flutter of the flight control surface 122 as induced by aerodynamic forces acting on the flight control surface 122.

As mentioned above, in examples where the inerter 300 is integrated into the actuator 202, the flywheel 314 may include a plurality of flywheel protrusions 320 (e.g., flywheel blades—see FIGS. 11-12) extending outwardly from the flywheel 314. The flywheel 314 and the flywheel protrusions 320 may be immersed in hydraulic fluid contained within the cap end chamber 236. In such examples, the method may include rotating the flywheel 314 within the hydraulic fluid and generating or increasing viscous damping of the actuator 202 movement in response to rotating the flywheel 314 in correspondence with the actuation of the movable device 124. The viscous damping may contribute toward the damping provided by the rotational inertia of the flywheel 314.

In still other examples, the method may include actively controlling the rotation of the flywheel 314 in correspondence with relative axial movement of the piston rod 224 and threaded shaft 322. For example, the inerter 300 may include or incorporate an electric flywheel motor 350 as described above in the examples illustrated in FIGS. 15-16 and 19-20. In some examples, as mentioned above, the actuator 202 may include a linear position sensor (not shown) configured to sense the linear position of the piston 216 within the actuator 202 and generate a signal representative of the piston position. The method may include commutating the flywheel motor 350 in correspondence with the linear position of the piston 216 as represented by the signal generated by the position sensor.

Active control of the flywheel 314 rotation may include accelerating and/or decelerating the flywheel 314 using the flywheel motor 350. For example, the flywheel motor 350 may be operated in a manner to apply a torque to the flywheel 314 in correspondence with or in the direction of rotation of the flywheel 314. In this regard, the flywheel motor 350 may assist a commanded direction of motion of the actuator 202. In some examples, active control of flywheel rotation may include accelerating the flywheel 314 during initiation of actuation by the actuator 202 of the movable device 124 toward a commanded position. In this regard, the flywheel motor 350 may rotationally accelerate the flywheel 314 at the start of axial acceleration of the first terminal 302 relative to second terminal 304 by an amount at least partially or completely eliminating the force generated at the first terminal 302 and second terminal 304 due to actuation of the movable device 124 by the actuator 202. By using the flywheel motor 350 to rotationally accelerate the flywheel 314 at the start of axial acceleration, the force required to axially move the first terminal 302 relative to the second terminal 304 may be reduced or eliminated which may increase the speed at which the actuator 202 moves the movable device 124 toward a commanded position.

Alternatively, the flywheel motor 350 may be operated in a manner to apply a torque to the flywheel 314 in a direction opposite the rotation of the flywheel 314. In this regard, the application of motor-generated torque in a direction opposite the rotation of the flywheel 314 may resist the torque generated by the relative axial acceleration of the first terminal 302 and second terminal 304. In this regard, active control by the flywheel motor 350 may oppose the terminal-developed torque at the end of actuator 202 motion when the commanded position is reached. In this manner, the step of actively controlling rotation of the flywheel 314 may include using the flywheel motor 350 to dynamically brake or decelerate the flywheel 314 as the actuator 202 approaches a commanded position to prevent position overshoot.

In a further example, active control of flywheel 314 rotation may include using a brake 360 (e.g., FIGS. 16 and 20) to decelerate the flywheel 314 as the actuator 202 approaches a commanded position of the movable device 124 to prevent position overshoot of the commanded position. The method may additionally include dynamically braking the rotation of the flywheel 314 such as to oppose disturbances (e.g., undesirable motion) of the actuator 202. The step of dynamically braking (e.g., decelerating or reducing rotational speed) of the flywheel 314 may be performed using a brake 360 operatively engageable to the flywheel 314 (e.g., FIGS. 16 and 20) or operatively engageable to a brake rotor (not shown) that may be fixedly coupled to the flywheel 314. Alternatively or additionally, the step of dynamically braking the flywheel 314 may be performed using rotational drag generated by the flywheel motor 350 as described above.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. An apparatus for damping an actuator, comprising: an inerter, including: a first terminal and a second terminal movable relative to one another along an inerter axis mutually exclusively couplable to a support structure and a movable device actuated by the actuator; a rod coupled to and movable with the first terminal; a threaded shaft coupled to and movable with the second terminal; a flywheel having a flywheel annulus coupled to at least one of the rod and the threaded shaft; and the flywheel rotatable in proportion to axial acceleration of the rod relative to the threaded shaft in correspondence with actuation of the movable device by the actuator.

2. The apparatus of claim 1, wherein:
the threaded shaft is non-rotatably coupled to the second terminal; and
the flywheel is rotatably coupled to the rod and threadably engaged to the threaded shaft in a manner such that axial acceleration of the rod relative to the threaded shaft causes proportional rotational acceleration of the flywheel.

3. The apparatus of claim 1, wherein:
the inerter is integrated into a linear electro-mechanical actuator.

4. The apparatus of claim 1, wherein: the actuator is a linear actuator having a rod end and a cap end axially movable relative to one another during actuation of the movable device, the rod end and cap end mutually exclusively coupled to one of the support structure and the movable device.

5. The apparatus of claim 4, wherein: the inerter is integrated into the actuator, the actuator is a hydraulic actuator having a piston coupled to an end of the rod and axially slidable within a housing; one of the rod end and the cap end of the actuator functioning as the first terminal of the inerter, a remaining one of the rod end and the cap end functioning as the second terminal; and the flywheel is rotatably coupled to one of the piston and the rod at the flywheel annulus, the flywheel threadably coupled to the threaded shaft to rotationally accelerate in proportion to axial acceleration of the piston relative to the threaded shaft.

6. The apparatus of claim 4, wherein:
the inerter is integrated into the actuator, the actuator is a hydraulic actuator having a piston coupled to an end of the rod and axially slidable within a housing, the piston dividing the housing into a cap end chamber and a rod end chamber;
one of the rod end and the cap end of the actuator functioning as the first terminal of the inerter, a remaining one of the rod end and the cap end functioning as the second terminal;
the flywheel is rotatably coupled to the second terminal;
the threaded shaft is fixedly coupled to the flywheel and rotatable in unison with the flywheel; and
the piston is fixedly coupled to the rod and threadably engaged to the threaded shaft in a manner such that linear translation of the rod relative to the threaded shaft causes rotation of the flywheel and threaded shaft in correspondence with actuation of the movable device by the actuator.

7. The apparatus of claim 1, wherein:
the flywheel includes a plurality of flywheel protrusions extending outwardly from the flywheel and generating viscous damping during rotation of the flywheel.

8. The apparatus of claim 1, wherein; the actuator is a hydraulic actuator operatable under a working pressure of at least 5000 psi.

9. The apparatus of claim 1, further comprising: a motor to actively control rotation of the flywheel in correspondence with relative axial movement of the rod and threaded shaft.

10. The apparatus of claim 9, wherein:
the motor is a permanent magnet direct current motor including one or more permanent magnets mounted to a flywheel perimeter and one or more windings mounted to one of a piston inner wall and a housing side wall.

11. The apparatus of claim 9, wherein: the actuator includes a linear position sensor to sense a linear position of a piston within the actuator; and the motor commutating in correspondence with the linear position of the piston.

12. The apparatus of claim 1, further comprising:
a brake operatively coupled to the flywheel and configured to decelerate the flywheel.

13. The apparatus of claim 1, wherein: the movable device controls a direction of travel of a vehicle.

14. The apparatus of claim 1, wherein:
the movable device is a flight control surface of an aircraft.

15. An aircraft, comprising: a flight control surface pivotably coupled to a support structure; a hydraulic actuator to actuate the flight control surface; an inerter, including: a first terminal and a second terminal mutually exclusively coupled to the support structure and the flight control surface; a rod movable with the first terminal; a threaded shaft movable with the second terminal; a flywheel coupled to at least one of the rod and the threaded shaft; and the flywheel rotatable in proportion to axial acceleration of the rod relative to the threaded shaft in correspondence with actuation of the flight control surface by the actuator.

16. A method of damping an actuator, comprising:
actuating, using an actuator, a movable device;
axially accelerating, using an inerter coupled to the movable device, a first terminal relative to a second terminal of the inerter simultaneous with and in proportion to actuation of the movable device;
rotationally accelerating a flywheel of the inerter in proportion to and simultaneous with the axial acceleration of the first terminal relative to the second terminal; and
reducing actuator load oscillatory amplitude of the movable device and actuator in response to rotationally accelerating the flywheel.

17. The method of claim 16, wherein the step of reducing actuator load oscillatory amplitude includes:
reducing actuator load oscillatory amplitude at resonance of the movable device.

18. The method of claim 16, wherein the step of reducing actuator load oscillatory amplitude includes:
reducing actuator load oscillatory amplitude at a resonant frequency of up to approximately 20 Hz.

19. The method of claim 16, wherein:
the movable device is a flight control surface of an aircraft.

20. The method of claim 16, wherein:
the inerter is integrated into the actuator, the actuator is a hydraulic actuator having a piston coupled to an end of a rod and axially slidable within a housing; and
the flywheel is rotatably coupled to one of the piston and the rod, the flywheel is threadably coupled to a threaded shaft.

21. The method of claim 16, further comprising the step of:
actively controlling rotation of the flywheel in correspondence with actuation of the movable device by the actuator.

22. The method of claim 21, wherein the step of actively controlling rotation of the flywheel comprises at least one of:
accelerating and decelerating the flywheel using a motor.

23. The method of claim 21, wherein the step of actively controlling rotation of the flywheel includes:

accelerating, using a motor, the flywheel during initiation of actuation by the actuator of the movable device toward a commanded position.

24. The method of claim 16, wherein the step of actively controlling rotation of the flywheel includes:

dynamically braking, using at least one of a motor and a brake, the flywheel as the actuator approaches a commanded position of the movable device.

\* \* \* \* \*